(12) United States Patent
Kagaya

(10) Patent No.: US 12,399,863 B2
(45) Date of Patent: Aug. 26, 2025

(54) COMMUNICATION APPARATUS, IMAGE CAPTURE APPARATUS AND CONTROL METHOD

(71) Applicant: CANON KABUSHIKI KAISHA, Tokyo (JP)

(72) Inventor: Sosuke Kagaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/400,048

(22) Filed: Dec. 29, 2023

(65) Prior Publication Data

US 2024/0134823 A1 Apr. 25, 2024
US 2024/0232136 A9 Jul. 11, 2024

Related U.S. Application Data

(63) Continuation of application No. PCT/JP2022/022747, filed on Jun. 6, 2022.

(30) Foreign Application Priority Data

Jul. 7, 2021 (JP) .................................. 2021-113138

(51) Int. Cl.
  *G06F 16/00* (2019.01)
  *G06F 16/16* (2019.01)
  *G06F 16/93* (2019.01)

(52) U.S. Cl.
  CPC .......... *G06F 16/164* (2019.01); *G06F 16/168* (2019.01); *G06F 16/93* (2019.01)

(58) Field of Classification Search
  CPC ........ G06F 16/93; G06F 16/168; G06F 16/14; G06F 16/164; H04N 1/32128; H04N 9/8205

(Continued)

(56) References Cited

U.S. PATENT DOCUMENTS 6,038,199 A * 3/2000 Pawlowski .............. G11C 7/16
7,868,895 B2 1/2011 Shintani
(Continued)

FOREIGN PATENT DOCUMENTS

JP 2002-055995 A 2/2002
JP 2006-309745 A 11/2006
(Continued)

OTHER PUBLICATIONS

JP-3997423-B2, "Information Processing Apparatus, Imaging Apparatus, And Information Classification Processing Method", Oct. 24, 2007, 34 Pages. (Year: 2007).*

(Continued)

*Primary Examiner* — Bai D Vu
(74) *Attorney, Agent, or Firm* — Venable LLP

(57) ABSTRACT

A communication apparatus that communicates with an external apparatus stores a file obtained from a first external apparatus, and stores first information related to at least one of a creation date and time and an update date and time of the file, and based on a format of the obtained file, determines whether the file is a first file to which the first information can be attached or a second file to which the first information cannot be attached. Where the obtained file is the first file, it is stored into the storage unit and the first information of the first file is stored thereinto, and where the obtained file is the second file, second information related to a recording date and time when the second file has been recorded is obtained and the first information is rewritten into the second information when storing the second file.

16 Claims, 16 Drawing Sheets

(58) Field of Classification Search
USPC .......................................................... 707/822
See application file for complete search history.

(56) References Cited

U.S. PATENT DOCUMENTS

| | | | |
|---|---|---|---|
| 8,068,813 B2 | 11/2011 | Shimosato | |
| 8,698,821 B2 | 4/2014 | Shintani | |
| 9,760,250 B2 | 9/2017 | Tokunaga | |
| 11,647,132 B2* | 5/2023 | Mitani | G11B 27/32 |
| | | | 348/207.1 |
| 2002/0049731 A1 | 4/2002 | Kotani | |
| 2008/0151291 A1* | 6/2008 | Ohno | G06F 16/51 |
| | | | 358/1.15 |
| 2009/0125928 A1* | 5/2009 | Matsushima | H04N 5/77 |
| | | | 720/697 |

FOREIGN PATENT DOCUMENTS

| | | |
|---|---|---|
| JP | 2007-166577 A | 6/2007 |
| JP | 2016-053840 A | 4/2016 |
| JP | 2021-015493 A | 2/2021 |
| JP | 2021-035025 A | 3/2021 |
| WO | 2021/039367 A1 | 3/2021 |

OTHER PUBLICATIONS

PCT International Search Report and Written Opinion mailed Aug. 23, 2022, in related PCT Application No. PCT/JP2022/022747 (with English translation).

\* cited by examiner

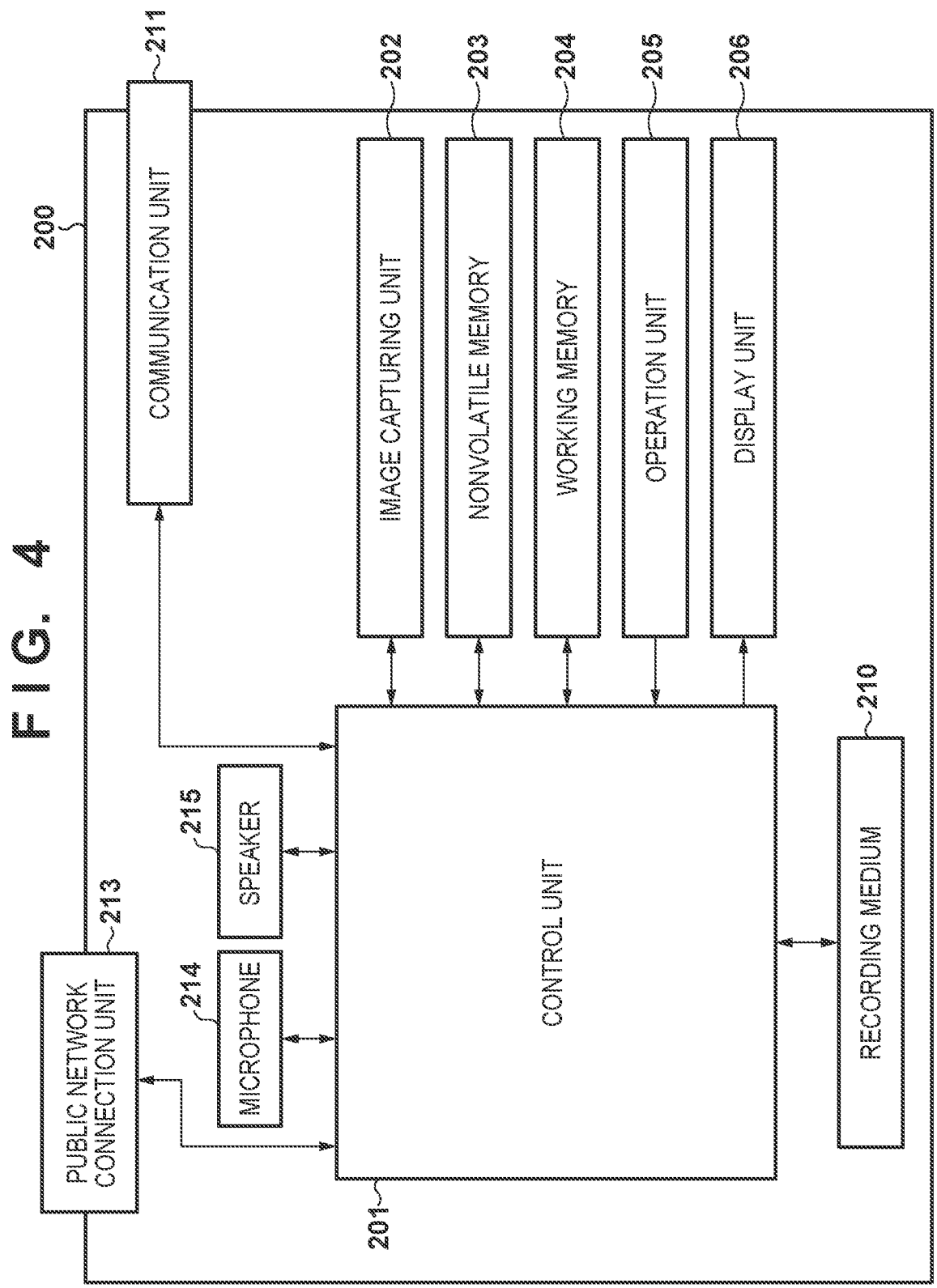

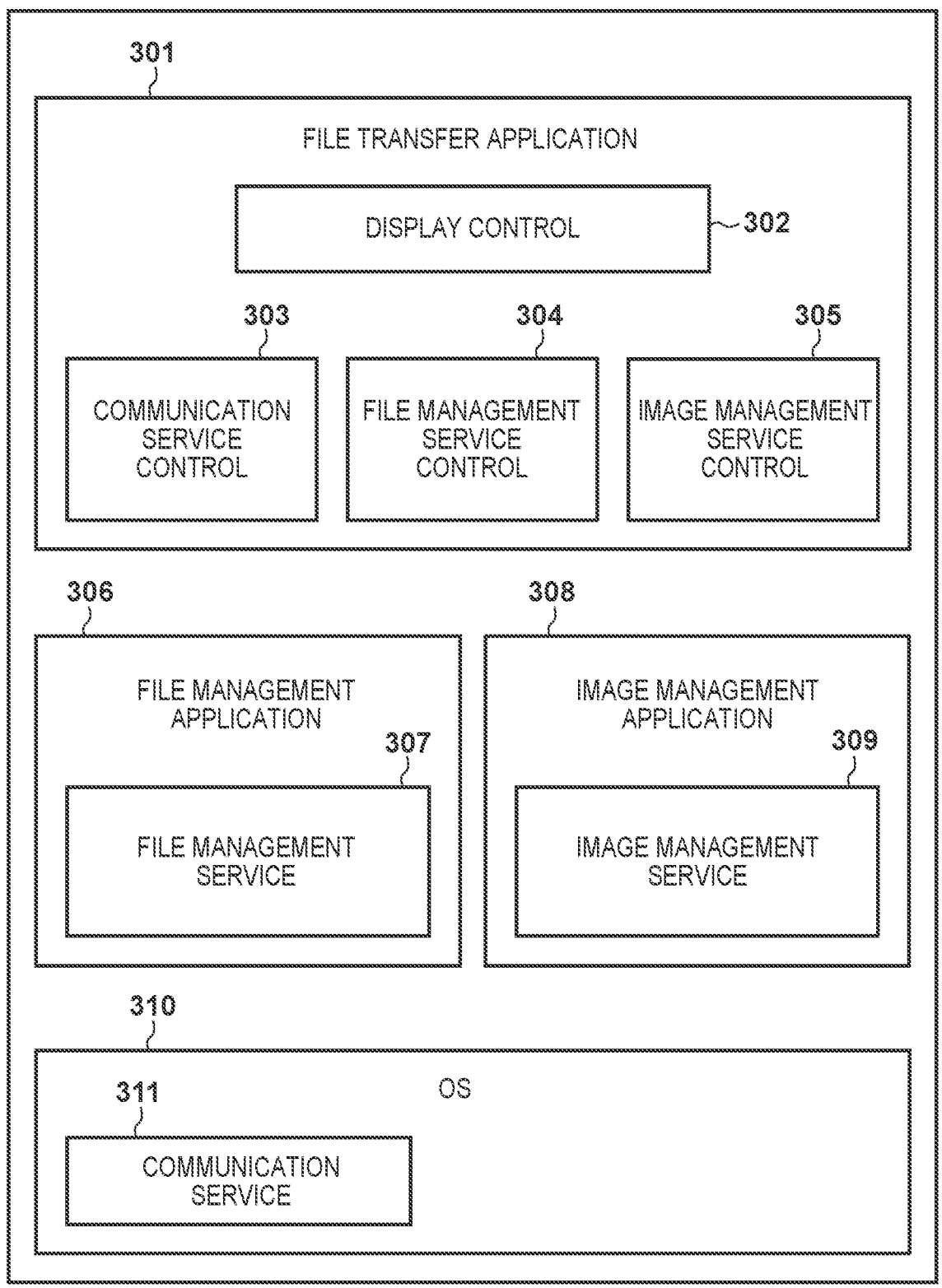

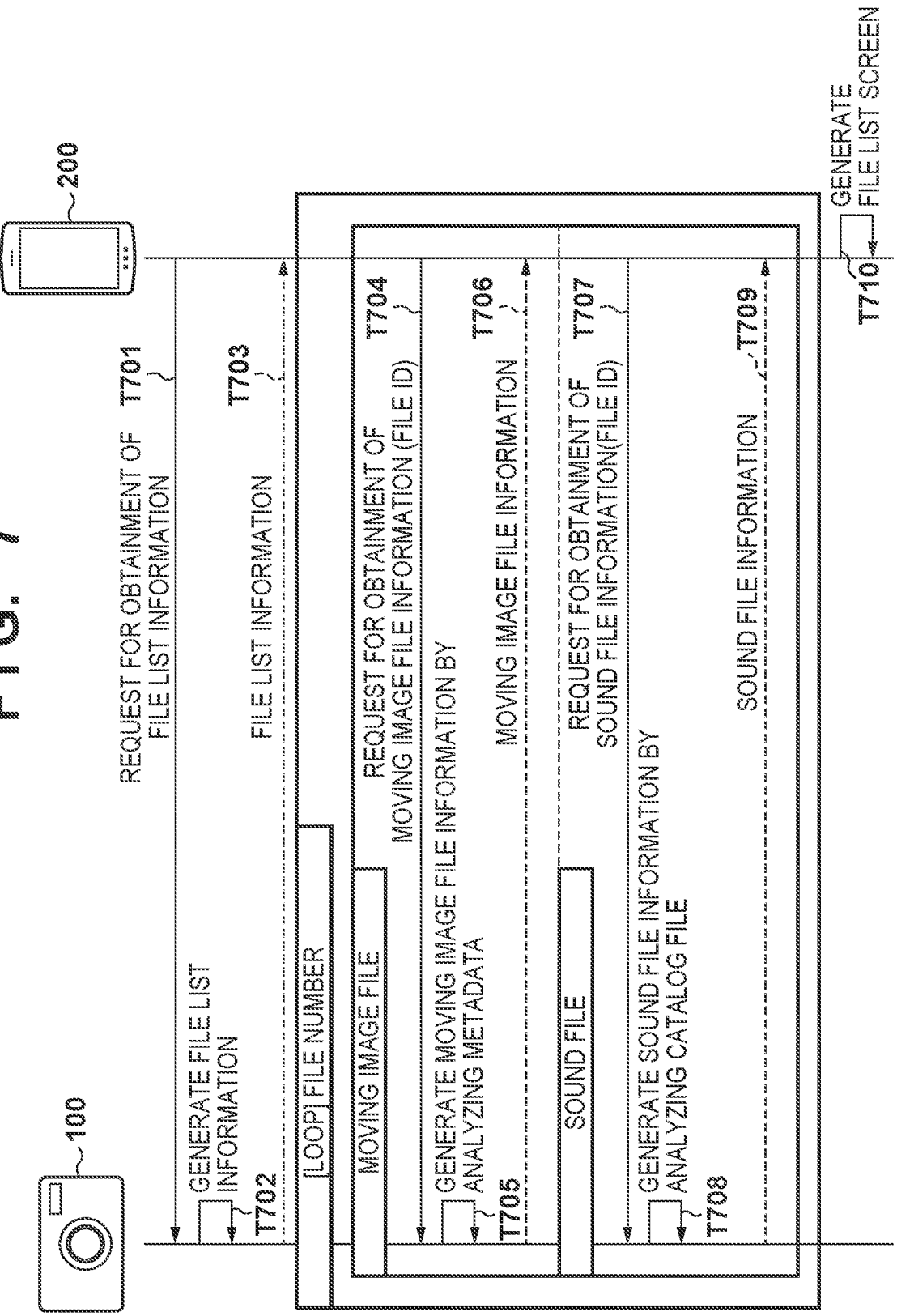

FIG. 11A

| FILE NAME | EXTENSION | CREATION DATE AND TIME | UPDATE DATE AND TIME | FILE SIZE |
|---|---|---|---|---|
| 1101 | 1102 | 1103 | 1104 | 1105 |
| MVIP0002 | WAV | 2021.01.02 09:30:20 | 2021.01.02 09:30:20 | 1234 |
| MVIP0003 | WAV | 2021.01.02 09:30:21 | 2021.01.02 09:30:21 | 567 |
| MVIP0004 | MP4 | 2021.01.02 09:30:25 | 2021.01.02 09:30:25 | 8901234 |

FIG. 11B

| FILE NAME | EXTENSION | CREATION DATE AND TIME | UPDATE DATE AND TIME | FILE SIZE |
|---|---|---|---|---|
| MVIP0002 | WAV | 2020.012.15 12:34:56 | 2020.12.15 12:34:56 | 1234 |
| MVIP0003 | WAV | 2020.12.31 06:22:11 | 2021.12.31 06:22:11 | 567 |
| MVIP0004 | MP4 | 2021.01.02 09:30:25 | 2021.01.02 09:30:25 | 8901234 |

COMMUNICATION APPARATUS, IMAGE CAPTURE APPARATUS AND CONTROL METHOD

CROSS-REFERENCE TO RELATED APPLICATIONS

This application is a Continuation of International Patent Application No. PCT/JP2022/022747, filed Jun. 6, 2022, which claims the benefit of Japanese Patent Application No. 2021-113138, filed Jul. 7, 2021, both of which are hereby incorporated by reference herein in their entirety.

BACKGROUND OF THE INVENTION

Field of the Invention

The present invention relates to a system in which an external apparatus and a communication apparatus are connected so as to be able to communicate with each other.

Background Art

PTL1 describes a technique to connect an image capture apparatus such as a digital camera to an external device such as a personal computer (PC) so as to be able to communicate with each other, and transmit contents stored in the image capture apparatus, including images and sounds, to the external device.

In recent years, the mass media industry such as press companies and communication companies has been facing an increasing need for speedy delivery of contents that have been captured at the site of news gathering, including images and sounds, to companies, and contents transfer solutions that involve intervention of various types of network communication have been provided. For example, as an application for a mobile device, a mobile application has been provided that has a function of transmitting contents generated on an image capture apparatus, including still images, moving images, and sounds, to a mobile device such as a smartphone, and transmitting the contents from the mobile device to an external server via a network using a communication method such as the File Transfer Protocol (FTP).

A mobile application displays contents stored in a mobile device, such as still images, moving images, and sounds, together with file information including a thumbnail, a file name, and a recording date and time, so as to facilitate classification by a user. Furthermore, a mobile application displays files that have been sorted chronologically in order of recording date and time, and displays only files of a specific recording date and time through filtering; this allows a user to view and select files in consideration of the recording date and time.

CITATION LIST

Patent Literature

PTL1: Japanese Patent Laid-Open No. 2007-166577

Meanwhile, according to the RIFF Waveform Audio Format (WAV), which is one type of sound files, image files of still images, moving images, and the like are not provided with a metadata area in which metadata such as a recording date and time is described. For this reason, when a sound file obtained from outside is stored into a mobile device, the recording date and time of this sound file cannot be stored. Therefore, when a mobile application displays, for example, a list of files stored in the mobile device, it is not possible to display files that have been sorted chronologically in order of recording date and time, or display only files of a specific recording date and time through filtering.

SUMMARY OF THE INVENTION

The present invention has been made in view of the aforementioned problem, and realizes a technique in which, even in a case where a file obtained from outside does not include supplementary information such as a creation date and time, display can be performed accurately in accordance with the recording date and time of the file.

In order to solve the aforementioned problems, the present invention provides a communication apparatus that communicates with an external apparatus, comprising: a storage unit that stores a file obtained from a first external apparatus, and stores first information related to at least one of a creation date and time and an update date and time of the file; and a control unit that in a case where the file obtained from the first external apparatus is a first file that is accompanied by the first information in the first external apparatus, stores the first file into the storage unit, and stores the first information of the first file thereinto, and in a case where the file obtained from the first external apparatus is a second file that is not accompanied by the first information, obtains, from the first external apparatus, second information related to a recording date and time when the second file has been recorded, and rewrites the first information into the second information when storing the second file into the storage unit.

In order to solve the aforementioned problems, the present invention provides an image capture apparatus that communicates with an external apparatus, comprising: a generation unit that generates a file; a management unit that generates file information including a recording date and time when the file has been recorded, and stores the file information into storage unit; and a control unit that, in a case where an obtainment request for file information of a predetermined file has been received from the external apparatus, transmits the file information including a recording date and time of the predetermined file stored by the management unit.

In order to solve the aforementioned problems, the present invention provides a control method for a communication apparatus that communicates with an external apparatus, comprising: storing a file obtained from a first external apparatus, and storing first information related to at least one of a creation date and time and an update date and time of the file into a storage unit; and in a case where the file obtained from the first external apparatus is a first file that is accompanied by the first information in the first external apparatus, storing the first file into the storage unit, and storing the first information of the first file thereinto, and in a case where the file obtained from the first external apparatus is a second file that is not accompanied by the first information, obtaining, from the first external apparatus, second information related to a recording date and time when the second file has been recorded, and rewriting the first information into the second information when storing the second file into the storage unit.

In order to solve the aforementioned problems, the present invention provides a control method for an image capture apparatus that communicates with an external apparatus, comprising: generating a file; generating file information including a recording date and time when the file has been recorded, and storing the file information into storage unit; and in a case where an obtainment request for file information of a predetermined file has been received from the external apparatus, transmitting the file information including a recording date and time of the predetermined file stored by the management unit.

Further features of the present invention will become apparent from the following description of exemplary embodiments with reference to the attached drawings.

BRIEF DESCRIPTION OF THE DRAWINGS

FIG. 4 is a block diagram showing a configuration of a mobile device 200 according to the present embodiment.

FIG. 5 is a software configuration diagram of the mobile device 200 according to the present embodiment.

FIG. 7 is a diagram for describing a processing sequence of the camera device 100 and the mobile device 200 according to the present embodiment.

FIG. 11A is an explanatory diagram of directory entries of the mobile device 200 according to the present embodiment.

FIG. 11B is an explanatory diagram of directory entries of the mobile device 200 according to the present embodiment.

DESCRIPTION OF THE EMBODIMENTS

Figure 1:
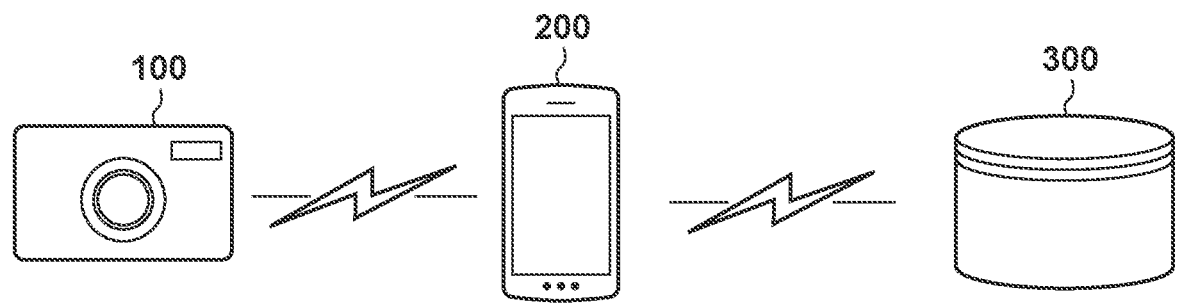
FIG. 1 is a system configuration diagram according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

With reference to the attached drawings, the following provides a detailed description of an embodiment in which an image capture apparatus of the present invention is applied to a camera device such as a digital camera, a communication apparatus of the present invention is applied to a mobile device such as a smart device, which is one type of mobile telephone, and a tablet device, and an information processing apparatus of the present invention is applied to a server that provides various services to the mobile device, which acts as a client.

<System Configuration>

First, a system configuration according to the present embodiment will be described with reference to FIG. 1.

The system according to the present embodiment includes a camera device 100, a mobile device 200, and a server 300. The camera device 100 and the mobile device 200 are connected so as to be able to communicate with each other via wireless antennas or a wired cable. The camera device 100 can transfer moving image files and sound files generated by the camera device 100 to the mobile device 200. The mobile device 200 and the server 300 are connected so as to be able to communicate with each other via mobile data communication that uses a line based on 4G/LTE, 5G, and the like. The mobile device 200 can transfer various types of information stored in the mobile device 200 to the server 300 using a communication method such as the File Transfer Protocol (FTP).

Note that the system configuration according to the present embodiment is not limited to the foregoing example; for instance, the camera device 100, the mobile device 200, and the server 300 may be connected to the same network via an access point without using mobile data communication to realize processing for file transfer among the discrete apparatuses.

<Configuration of Camera Device 100>

Figure 2A:
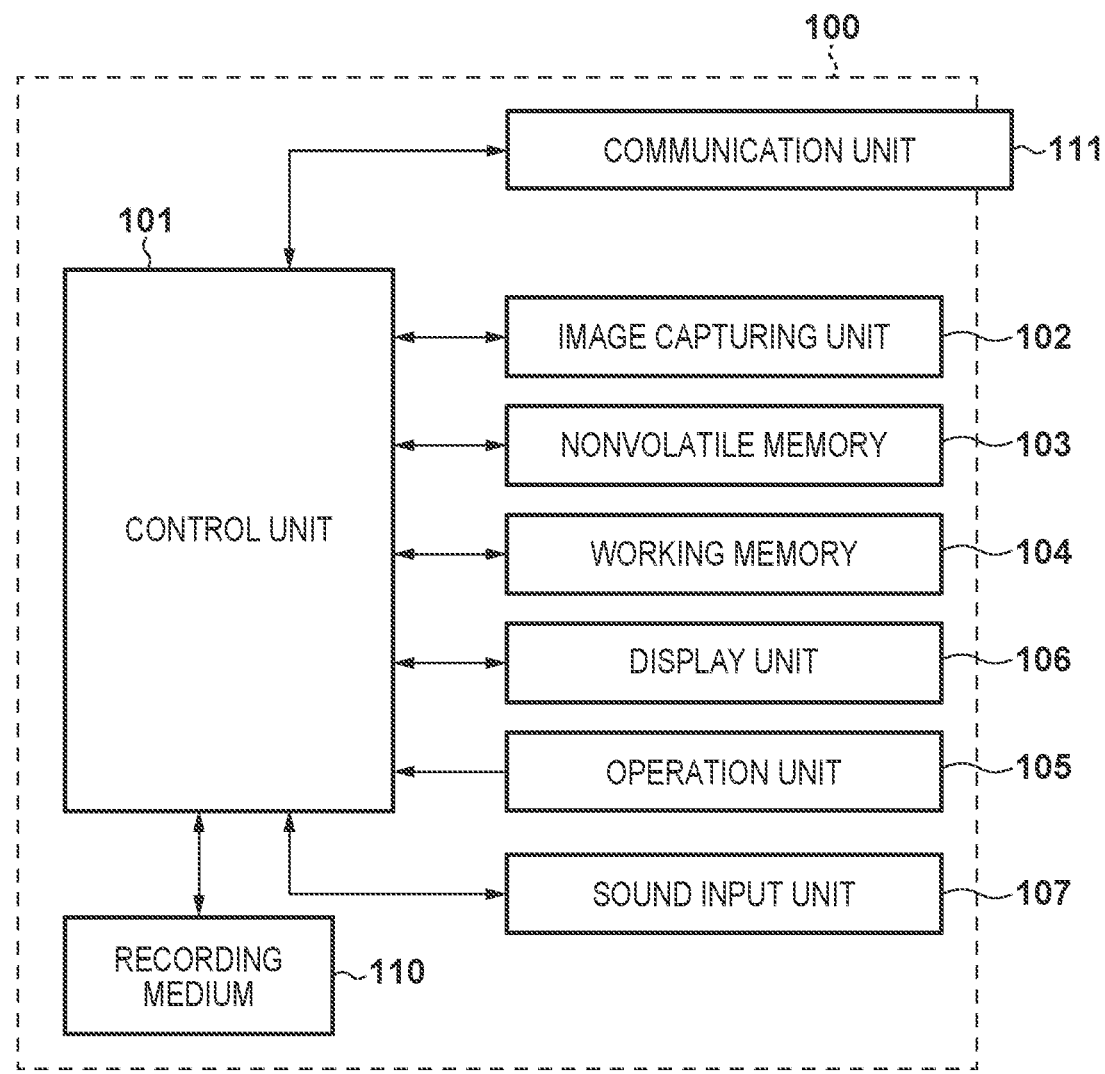
FIG. 2A is a block diagram showing a configuration of a camera device 100 according to the present embodiment.

First, a configuration and functions of the camera device 100 according to the present embodiment will be described with reference to FIG. 2A.

Note that although the present embodiment describes a camera device such as a digital camera, no limitation is intended by this, and the camera device may be an information processing apparatus such as a tablet device and a personal computer equipped with a camera function, a media player, a surveillance camera, a medical camera, and the like.

A control unit 101 is a central processing unit (CPU) that performs integrated control on the entire camera device 100, and realizes later-described communication processing and control processing by executing a program stored in a later-described nonvolatile memory 103. Note that the entire apparatus may be controlled by a plurality of items of hardware sharing processing, instead of the control unit 101 controlling the entire apparatus.

An image capturing unit 102 includes a lens assembly including a zoom lens and a focus lens, and a shutter that has a diaphragm function. Also, the image capturing unit 102 includes an image sensor comprised of, for example, a CCD or CMOS element that converts a subject image into electrical signals, and an A/D converter that converts analog image signals output from the image sensor into digital signals. Under control of the control unit 101, the image capturing unit 102 converts light of the subject image formed by the lenses included in the image capturing unit 102 into electrical signals with use of the image sensor, executes noise reduction processing and the like, and outputs image data comprised of digital signals.

The control unit 101 executes pixel interpolation, resize processing such as reduction, and color conversion processing with respect to image data captured by the image capturing unit 102. Also, the control unit 101 generates image files by compressing and encoding still image data to which image processing has been applied using a JPEG format and the like, and encoding moving image data using a moving image compression method such as an MP4 format, and records the image files into a recording medium 110. In the camera device 100 according to the present embodiment, image data is recorded into the recording medium 110 in conformity with the standard of Design Rule for Camera File system (DCF). Furthermore, the control unit 101 executes predetermined computation processing using captured image data, and the control unit 101 controls the focus lens, diaphragm, and shutter of the image capturing unit 102 based on the obtained computation result; as a result, autofocus (AF) processing and automatic exposure (AE) processing are executed.

The nonvolatile memory 103 is an electrically erasable and recordable memory; for example, an EEPROM or the like is used thereas. Constants for the operations of the control unit 101, a program, and the like are recorded in the nonvolatile memory 103. The program mentioned here refers to a program for executing communication processing and control processing, which will be described later in the present embodiment.

A working memory 104 is used as a working area to which constants and variables for the operations of the control unit 101, the program that has been read out from the nonvolatile memory 103, and the like are deployed. Furthermore, the working memory 104 is used as a buffer memory that temporarily holds image data captured by the image capturing unit 102, and as an image display memory for a display unit 106.

Figure 2B:
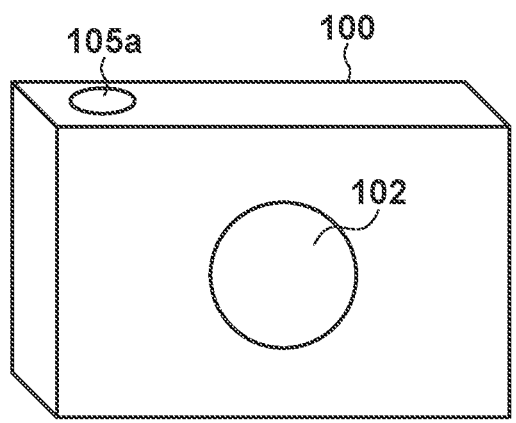
FIG. 2B is a front view showing the configuration of the camera device 100 according to the present embodiment.
Figure 2C:
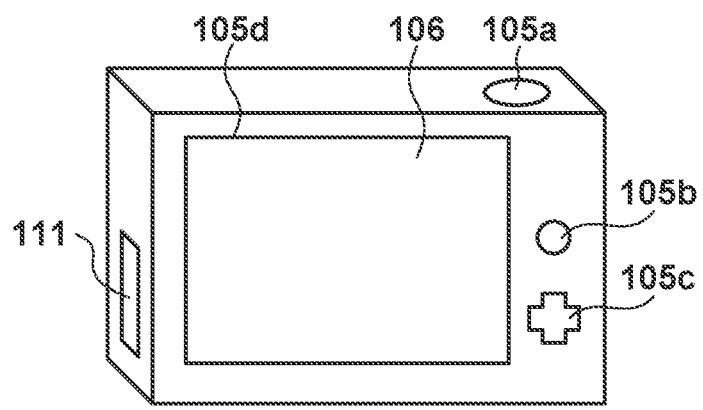
FIG. 2C is a rear view showing the configuration of the camera device 100 according to the present embodiment.

An operation unit 105 is comprised of operation members that accept various types of operations from a user, such as various types of switches, buttons, and a touch panel. For example, as shown in FIG. 2B and FIG. 2C, the operation unit 105 includes a shutter button 105a for capturing images, a reproduction button 105b for reproducing captured images, a four-directional key 105c comprised of up, down, left, and right buttons for configuring various types of camera settings, and so forth. Furthermore, a touch panel 105d that is formed integrally with the later-described display unit 106 is also included in the operation unit 105. In addition, the operation unit 105 includes an operation member, such as a dedicated connection button, for starting communication with an external apparatus via a later-described communication unit 111.

The display unit 106 displays viewfinder images during image capture, captured images, characters for interactive operations, and so forth. The display unit 106 is, for example, a display device such as a liquid crystal display and an organic EL display. The display unit 106 may be configured to be integrated with the camera device 100, or may be an external apparatus connected to the camera device 100. It is sufficient that the camera device 100 be capable of connecting to the display unit 106, and have a function of controlling display on the display unit 106.

A sound input unit 107 uses one or more microphones built in the camera device 100 or connected via a sound terminal to collect the sounds around the camera device 100 and converts them into electrical signals. The sound input unit 107 converts analog sound signals that have been generated by collecting the sounds around the camera device 100 into digital signals, and outputs the digital signals to the control unit 101. The control unit 101 generates sound data by executing various types of sound processing with respect to the digital signals generated by the sound input unit 107. The microphones may be directional microphones or non-directional microphones. The control unit 101 generates a sound file by compressing and encoding the sound data generated by the sound input unit 107 using a WAV format and the like, and records the sound file into the recording medium 110.

The recording medium 110 records image data output from the image capturing unit 102 and sound data output from the sound input unit 107. Also, the control unit 101 reads out image files and sound files stored in the recording medium 110 in a reproduction mode. The recording medium 110 may be, for example, a memory card or a hard disk drive attached to the camera device 100, or may be a flash memory or a hard disk drive built in the camera device 100. It is sufficient that the camera device 100 include at least a component for accessing the recording medium 110.

The communication unit 111 is an interface for connecting to an external apparatus, such as the mobile device 200. The camera device 100 according to the present embodiment can exchange data with an external apparatus via the communication unit 111. For example, image data generated by the image capturing unit 102 and sound data generated by the sound input unit 107 can be transmitted to an external apparatus via the communication unit 111. Note that in the present embodiment, the communication unit 111 includes an interface for communicating with an external apparatus via a wireless LAN in conformity with the IEEE 802.11 standard. The control unit 101 realizes wireless communication with an external apparatus by controlling the communication unit 111. Note that the communication method is not limited to the wireless LAN, and can include, for example, a wireless communication interface such as an infrared communication interface and Wireless USB, and a wired communication interface such as a USB cable, HDMI (registered trademark), and IEEE 1394.

Note that the communication unit 111 of the camera device 100 according to the present embodiment has an AP mode in which it operates as an access point in an infrastructure mode, and a CL mode in which it operates as a client in the infrastructure mode. Then, by causing the communication unit 111 to operate in the CL mode, the camera device 100 according to the present embodiment can operate as a CL device in the infrastructure mode. When operating as a CL device, the camera device 100 can join a network formed by an AP device therearound by connecting to the AP device. Furthermore, by causing the communication unit 111 to operate in the AP mode, the camera device 100 according to the present embodiment can also operate as a simplified AP (hereinafter, a simple AP), which is one type of AP but is more limited in function. When the camera device 100 operates as a simple AP, the camera device 100 forms a network by itself. An apparatus around the camera device 100 can recognize the camera device 100 as an AP device, and join the network formed by the camera device 100. It is assumed that a program for causing the camera device 100 to operate in the above-described manner is held in the nonvolatile memory 103.

Note that the camera device 100 according to the present embodiment is a simple AP that is one type of AP but does not have a gateway function of transferring data received from a CL device to an Internet provider and the like. Therefore, even if the camera device has received data from another apparatus that is joining a network formed by the camera device itself, the camera device cannot transfer the data to a network such as the Internet.

<Directory Structure of Files Stored in Recording Medium 110>

Figure 3:
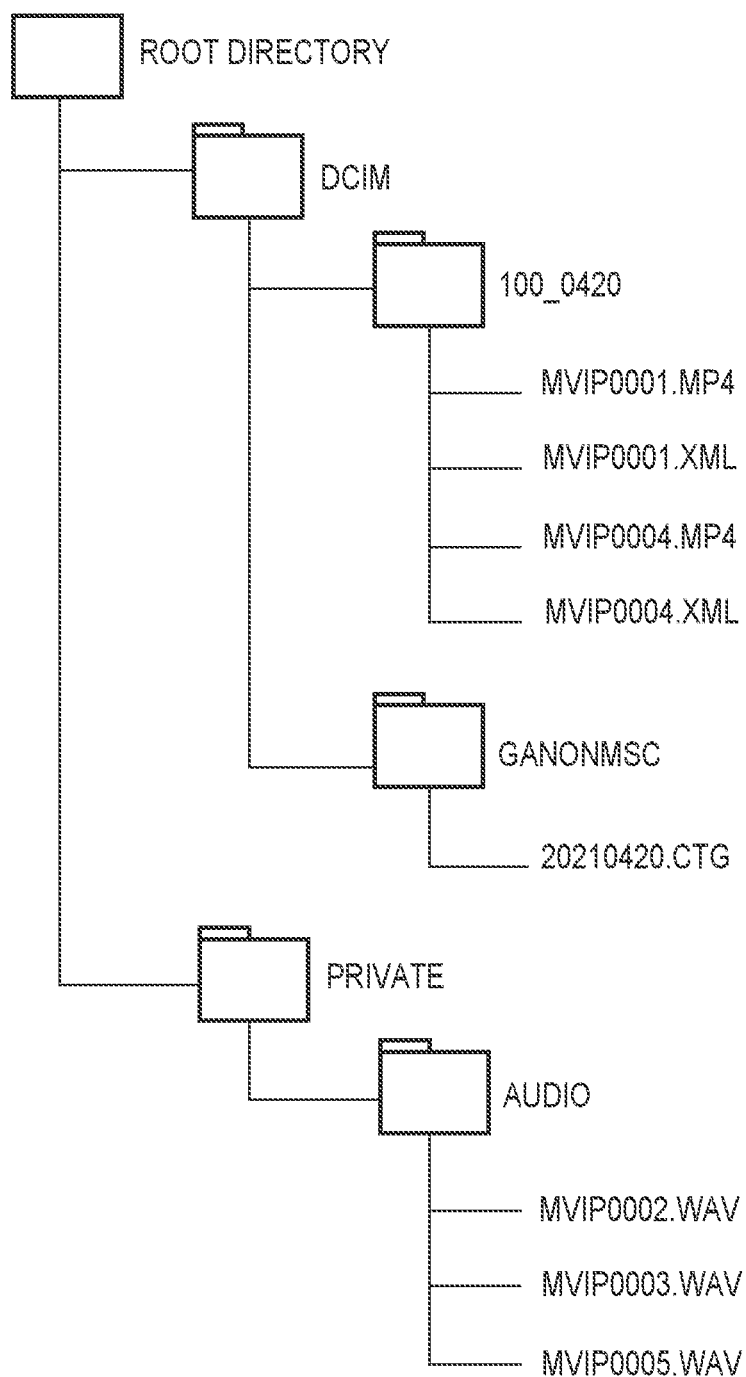
FIG. 3 is an explanatory diagram of directories of files stored in the camera device 100 according to the present embodiment.

Next, a directory structure of files stored in the recording medium 110 will be described with reference to FIG. 3.

The recording medium 110 has been formatted using a file system that allows reference from an operating system (OS), such as Extended File Allocation Table (exFAT).

The control unit 101 records moving image data generated by the image capturing unit 102 as moving image files in the MP4 format under the directory "100_0420" (the last four digits are assumed to be the current date) under the "DCIM" directory. Furthermore, based on metatemplate information that has been read out from the nonvolatile memory 103, the control unit 101 generates metadata files (supplementary information files) in which metadata of the moving image files has been described in the eXtensible Markup Language (XML) format. Metadata is supplementary information that is used for data management at the transmission destination of the moving image data, and information such as a category, a title, and a comment of the moving image data is input to related tags of the XML files.

The control unit 101 records sound data generated by the sound input unit 107 as sound files in the WAV format under the "AUDIO" directory under the "PRIVATE" directory.

Furthermore, when the image capturing unit 102 and the sound input unit 107 have generated moving image data and sound data, the control unit 101 generates or updates a catalog file for file management under the "GANONMSC" directory under the "DCIM" directory. Recorded in the catalog file is file information pieces in which the file names and the recording dates and times of the files stored in the recording medium 110 are associated with each other.

The recording medium 110 stores the moving image files recorded in the MP4 format, the metadata files recorded in the XML format, the sound files recorded in the WAV format, and the catalog file for managing file information pieces of respective files.

<Configuration of Mobile Device 200>

Next, a configuration and functions of the mobile device 200 according to the present embodiment will be described with reference to FIG. 4.

Although the present embodiment describes a mobile device such as a smartphone, which is one type of mobile telephone, no limitation is intended by this, and the mobile device may be a digital camera equipped with a communication function, a tablet device, a personal computer, a wristwatch-shaped smartwatch, a wearable computer such as eyeglass-shaped smartglasses, and so forth.

The mobile device 200 according to the present embodiment includes a control unit 201, an image capturing unit 202, a nonvolatile memory 203, a working memory 204, an operation unit 205, a display unit 206, a recording medium 210, and a communication unit 211. The basic functions of these elements are similar to those of the camera device 100, and a detailed description thereof is omitted.

The nonvolatile memory 203 stores an operating system (OS), which is basic software executed by the control unit 201, and an application that realizes applicative functions in coordination with this OS. Also, the nonvolatile memory 203 stores an application for communicating with the camera device 100 and the server 300. Furthermore, the nonvolatile memory 203 stores a file transfer application for communicating with the camera device 100 and the server 300. Moreover, the nonvolatile memory 203 stores a file management application that stores and manages image files of still image data, moving image data, and the like obtained from the camera device 100, and metadata files and sound files related to the image files. In addition, the nonvolatile memory 203 stores an image management application that stores and manages particularly the image files among the image files of still image data, moving image data, and the like obtained from the camera device 100 and the metadata files and the sound files related to the image files.

Processing of the mobile device 200 according to the present embodiment is realized by reading in software provided by applications. Note that the applications are assumed to include software for using basic functions of the OS installed on the mobile device 200. Note that the OS of the mobile device 200 my include software for realizing processing in the present embodiment.

The communication unit 211 includes a wireless communication interface for wirelessly communicating with an external apparatus such as the camera device 100 and the server 300. The control unit 201 realizes wireless communication with an external apparatus by controlling the communication unit 211. Note that the communication unit 211 may be connected directly to the camera device 100 and the server 300, or may be configured to be connected thereto via an access point. For example, the Picture Transfer Protocol over Internet Protocol (PTP/IP) via the wireless LAN can be used as a protocol for data communication. Note that communication with the camera device 100 and the server 300 is not limited to the foregoing. For example, the communication unit 211 can include a wireless communication module such as an infrared communication module, a Bluetooth (registered trademark) communication module, and Wireless USB. Furthermore, a wired connection interface such as a USB cable, HDMI (registered trademark), and IEEE 1394 may be used.

A public network connection unit 213 is an interface used in performing wireless communication via a wide area network (WAN) such as 4G/LTE and 5G. The mobile device 200 can call, or perform data communication with, another device via the public network connection unit 213. During a call, the control unit 201 handles input and output of sound signals via a microphone 214 and a speaker 215. In the present embodiment, the public network connection unit 213 is not limited to using 4G/LTE or 5G, and may use other communication methods including local 5G, WiMAX, ADSL, and FTTH. In the present embodiment, the public network connection unit 213 is an antenna, and the control unit 201 can connect to a public network via the antenna. Note that the communication unit 211 and the public network connection unit 213 need not necessarily be comprised of independent hardware, and one antenna may double as both of them, for instance.

Note that as the communication speed of communication realized by the communication unit 211 is higher than the communication speed of communication realized by the public network connection unit 213, the mobile device 200 according to the present embodiment prioritizes communication via the communication unit 211 in a state where it is not calling another device via the public network connection unit 213.

<Software Configuration of Mobile Device 200>

Next, a software configuration of the mobile device 200 according to the present embodiment will be described with reference to FIG. 5.

In the mobile device 200 according to the present embodiment, the nonvolatile memory 203 stores fixed data such as parameters, and software such as firmware.

The recording medium 210 stores an OS 310 that is basic software executed by the control unit 201, as well as a file management application 306 and an image management application 308 that are items of applicative software executed by the control unit 201. It also stores, as an item of applicative software, a file transfer application 301 that has a function of connecting to the camera device 100 and obtaining and storing files, and of connecting to the server 300 and transferring the files.

When a user has turned ON a power switch included in the operation unit 205 of the mobile device 200, the mobile device 200 is activated, and the control unit 201 reads out the OS 310 from the recording medium 210, deploys the same to the working memory 204, and executes the same. Furthermore, various components of the mobile device 200 are controlled in accordance with the OS 310 and an application installed on the OS 310.

The OS 310 not only has a function of controlling various components of the mobile device 200, but also provides a variety of services to applications. The OS 310 includes a communication service 311 as a function according to the present embodiment.

The communication service 311 controls ON/OFF of a communication function, connection to an external apparatus, and data communication with the connected external apparatus. It also controls provision of data obtained through the communication function to applications, and transmission/reception of data to/from an external apparatus in response to requests from applications.

The file management application 306 includes a file management service 307 that manages files stored in the recording medium 210. Also, the file management application 306 controls readout of managed files from the recording medium 210, and writing of files to the recording medium 210 in response to requests from applications.

The image management application 308 includes an image management service 309 that manages image files of still images and moving images stored in the recording medium 210. Unlike the file management application 306, the image management application 308 has functions focused on management of image files, such as a function of displaying a list of thumbnails of image files, and a function of frame-by-frame advance of moving image files. Also, the image management application 308 controls readout of managed files from the recording medium 210, and writing of files to the recording medium 210 in response to requests from applications.

Note, it is assumed that the files managed by the file management application 306 and the files managed by the image management application 308 are stored in different areas of the recording medium 210, and they cannot refer to each other.

Next, the file transfer application 301 according to the present embodiment will be described.

Through display control 302, the file transfer application 301 generates UI screens to be displayed on the display unit 206. The configuration of the UI screens will be described later using FIGS. 6A to 6G.

Through communication service control 303, the file transfer application 301 communicates with the camera device 100 using the communication service 311, and obtains main data of each file stored in the camera device 100, information of a list of files, and file information pieces of respective files. It also reads out files stored in the recording medium 210 and transmits them to the server 300 using the communication service 311.

Through file management service control 304, the file transfer application 301 writes and stores main data files held in the working memory 204 to the recording medium 210 using the file management service 307.

Through image management service control 305, the file transfer application 301 writes and stores main data files held in the working memory 204 to the recording medium 210 using the image management service 309.

<Configuration of UI Screens>

Next, the configuration and functions of UI screens provided by the file transfer application 301 will be described with reference to FIGS. 6A to 6G.

Figure 6A:
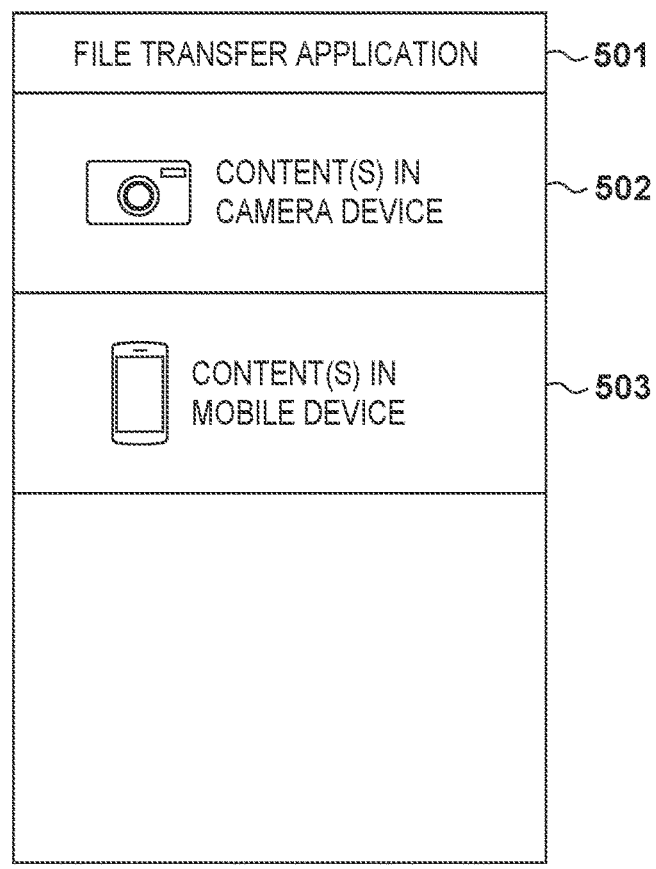
FIG. 6A is a diagram exemplarily showing a UI screen of a file transfer application 301 of the mobile device 200 according to the present embodiment.

A UI screen 501 shown in FIG. 6A is a function selection screen that is displayed while connected to the camera device 100 after the file transfer application 301 has been activated. The function selection screen 501 includes a button 502 for selecting a function of displaying the files stored in the camera device 100, and a button 503 for selecting a function of displaying the files stored in the recording medium 210 of the mobile device 200.

Figure 6B:
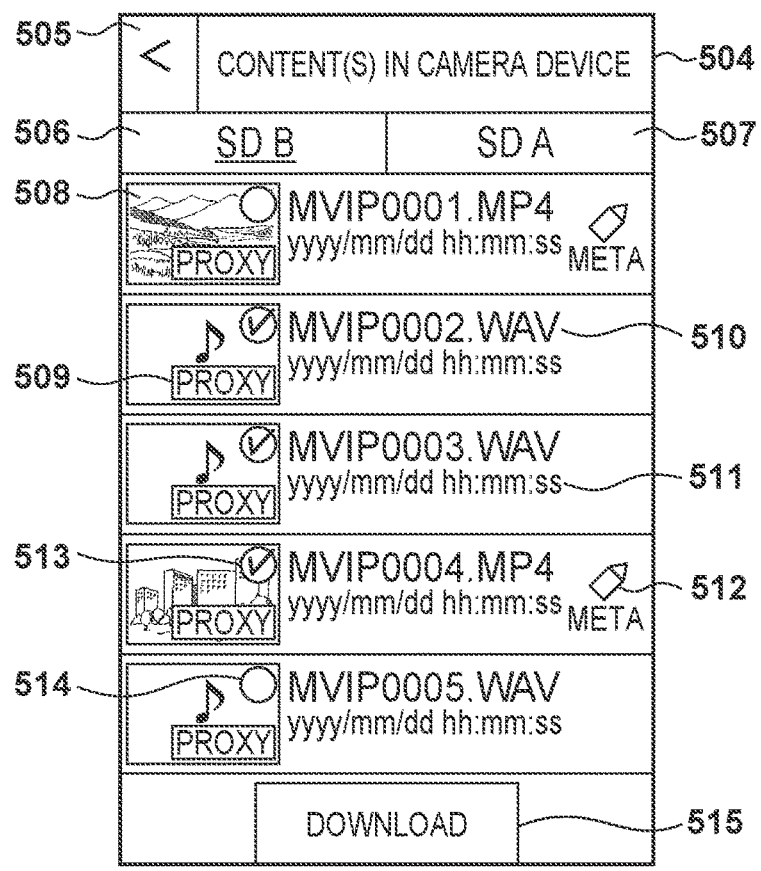
FIG. 6B is a diagram exemplarily showing a UI screen of the file transfer application 301 of the mobile device 200 according to the present embodiment.

A UI screen 504 shown in FIG. 6B is a screen of a list of files stored in the camera device 100 connected to the mobile device 200. The list screen 504 is displayed when the button 502 has been tapped on the function selection screen 501.

The list screen 504 includes a button 505 for returning to a previous screen, as well as buttons 506 and 507 for selecting a recording medium 110 that acts as a file reference destination in a case where the camera device 100 includes a plurality of recording mediums 110. The list screen 504 of FIG. 6B is in a state where the recording medium 110 corresponding to the button 506 with underlined characters has been selected, and displays a list of files stored in the recording medium 110 displayed under the button 506.

Parts 508 to 514 on the list screen 504 of FIG. 6B are generated from information of a list of files stored in the camera device 100 connected to the mobile device 200 and from information related thereto. Note that the following describes contents displayed by the parts 508 to 512; a method of obtaining information related to files for displaying the discrete parts 508 to 512 will be described later using FIGS. 7A and 7B and FIGS. 8A and 8B.

The part 508 is a part for displaying a thumbnail of a file; it displays a thumbnail appended to a moving image file in the case of a moving image file, and displays an image indicating a sound file stored in the nonvolatile memory 203 in the case of a sound file.

The part 509 is an icon indicating that a moving image file or a sound file is a proxy file. A proxy file is a file with data that has been reduced in size by lowering the bit rate or the resolution compared to a normal file, and the user can determine that a file is a proxy file when the fourth letter of its file name is "P". On the list screen 504 of FIG. 6B, every file is a proxy file, and thus the icon 509 is superimposed and displayed on every thumbnail.

The part 510 is a character string indicating a file name, and the part 511 is a character string indicating the recording date and time of a file.

The part 512 is an icon indicating whether a metadata file indicating metadata of a moving image file is stored in the same recording medium.

The parts 513 and 514 are icons indicating a selected/unselected state of a file, and are superimposed and displayed on the thumbnail 508. The icon 513 indicates a selected state, whereas the icon 514 indicates an unselected state. Each time the thumbnail 508 of any file is tapped, the selected/unselected state of the file is switched, and the icon that is displayed in accordance with the selected/unselected state of the file is switched to the icon 513 or the icon 514.

A button 515 is a button for starting the storing of files from the camera device 100 to the mobile device 200. The files to be stored are the files in the selected state.

Figure 6C:
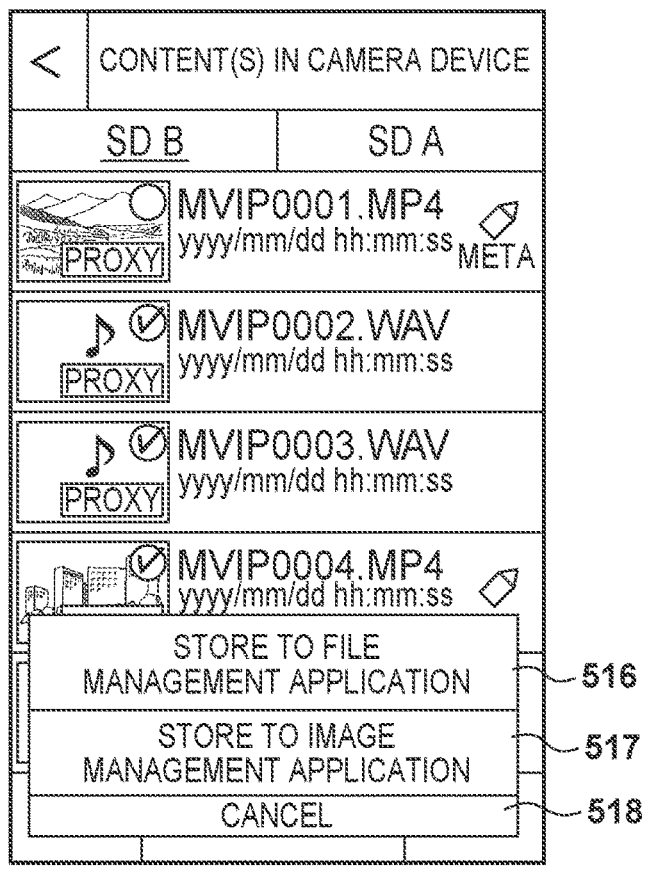
FIG. 6C is a diagram exemplarily showing a UI screen of the file transfer application 301 of the mobile device 200 according to the present embodiment.

Parts 516 to 518 on the list screen 504 of FIG. 6C are buttons for selecting an application to which files imported from the camera device 100 to the mobile device 200 are to be stored in a state where the camera device 100 is connected to the mobile device 200, and are superimposed and displayed on the list screen 504 when the button 515 on the list screen 504 of FIG. 6B has been tapped.

The part 516 is a button for selecting the file management application 306 as the application to which the files are to be stored. Tapping the button 516 will start processing for transferring the files stored in the camera device 100 to the mobile device 200 and storing them into the file management application 306. Here, the files to be stored into the file management application 306 are files in the selected state and metadata files related to the files in the selected state.

The part 517 is a button for selecting the image management application 308 as the application to which the files are to be stored. Tapping the button 517 will start processing for transferring the files stored in the camera device 100 to the mobile device 200 and storing them into the image management application 308. Here, as the image management application 308 is an application that is capable of managing image files, the files to be stored into the image management application 308 are only moving image files in the selected state.

The button 518 is a button for cancelling the storing of files. Tapping the button 518 results in a return to the list screen 504 of FIG. 6B.

Figure 6D:
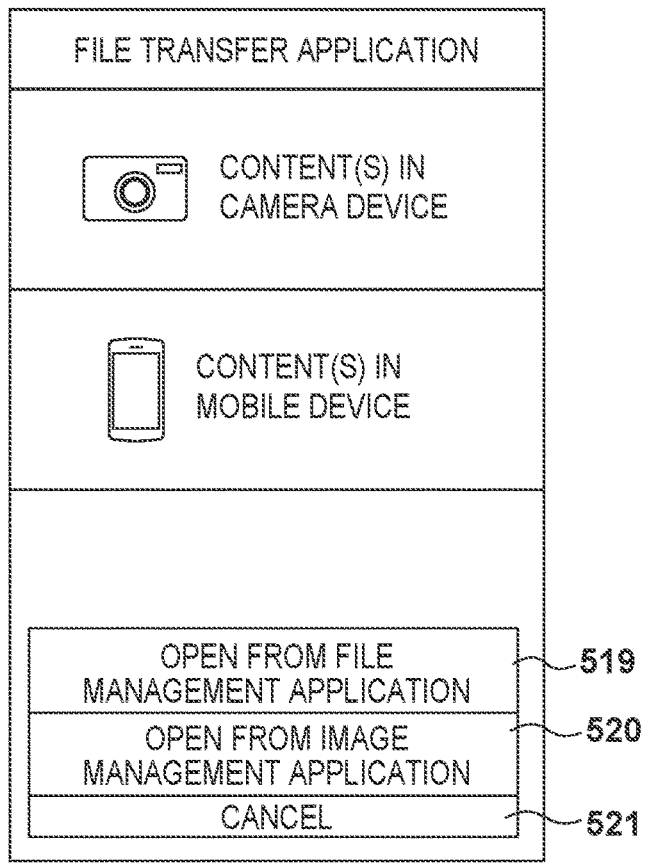
FIG. 6D is a diagram exemplarily showing a UI screen of the file transfer application 301 of the mobile device 200 according to the present embodiment.

Parts 519 to 521 on the function selection screen 501 of FIG. 6D are buttons for selecting an application that serves as a readout source when files are read out from the recording medium 210, and are superimposed and displayed on the function selection screen 501 of FIG. 6A when the button 503 on the function selection screen 501 of FIG. 6A has been tapped.

The part 519 is a button for selecting the file management application 306 as the application that serves as the file readout source. Tapping the button 519 will start processing for reading out files from the file management application 306. A screen for selecting the files managed by the file management application 306 will be described later using FIG. 6E.

The part 520 is a button for selecting the image management application 308 as the application that serves as the file readout source. Tapping the button 520 will start processing for reading out files from the image management application 308. A screen for selecting the files managed by the image management application 308 will be described later using FIG. 6F.

The button 521 is a button for cancelling the readout of files; tapping the button 521 results in a return to the function selection screen 501 of FIG. 6A.

Figure 6E:
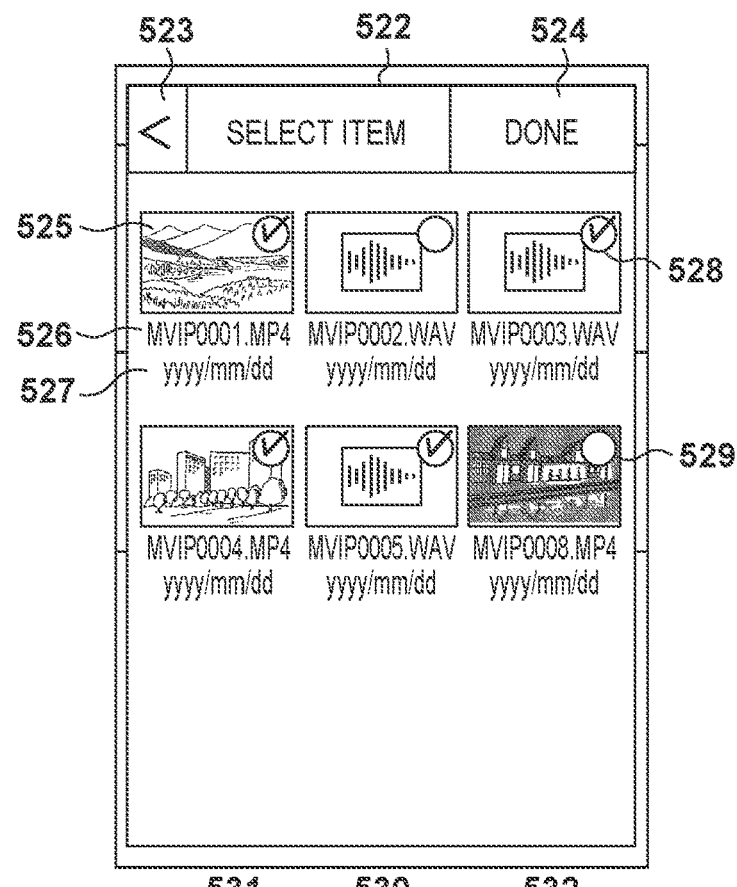
FIG. 6E is a diagram exemplarily showing a UI screen of the file transfer application 301 of the mobile device 200 according to the present embodiment.

A UI screen 522 shown in FIG. 6E is a screen provided by the OS 310, and is a selection screen for selecting files to be read out from among the files managed by the file management application 306. When the button 519 on the function selection screen 501 of FIG. 6D has been tapped, the selection screen 522 is superimposed and displayed on the function selection screen 501 of FIG. 6A. In the present embodiment, it is assumed that the files that can be selected on the selection screen 522 are only moving image files in the MP4 format and sound files in the WAV format.

The selection screen 522 of FIG. 6E includes parts 523 to 529.

The part 523 is a button for returning to a previous screen; when the return button 523 has been tapped, the function selection screen 501 of FIG. 6A is displayed.

Figure 6F:
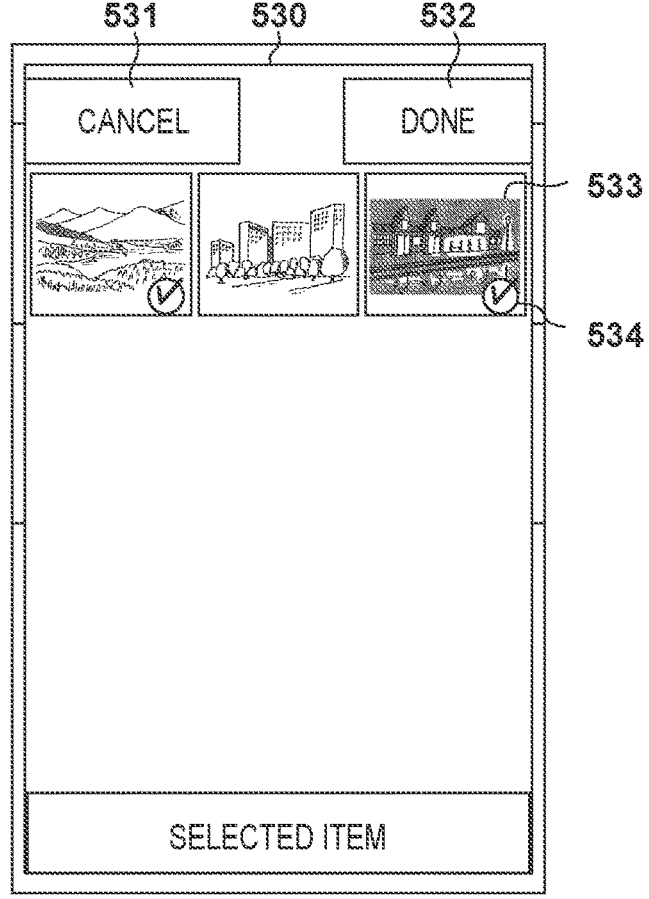
FIG. 6F is a diagram exemplarily showing a UI screen of the file transfer application 301 of the mobile device 200 according to the present embodiment.
Figure 6G:
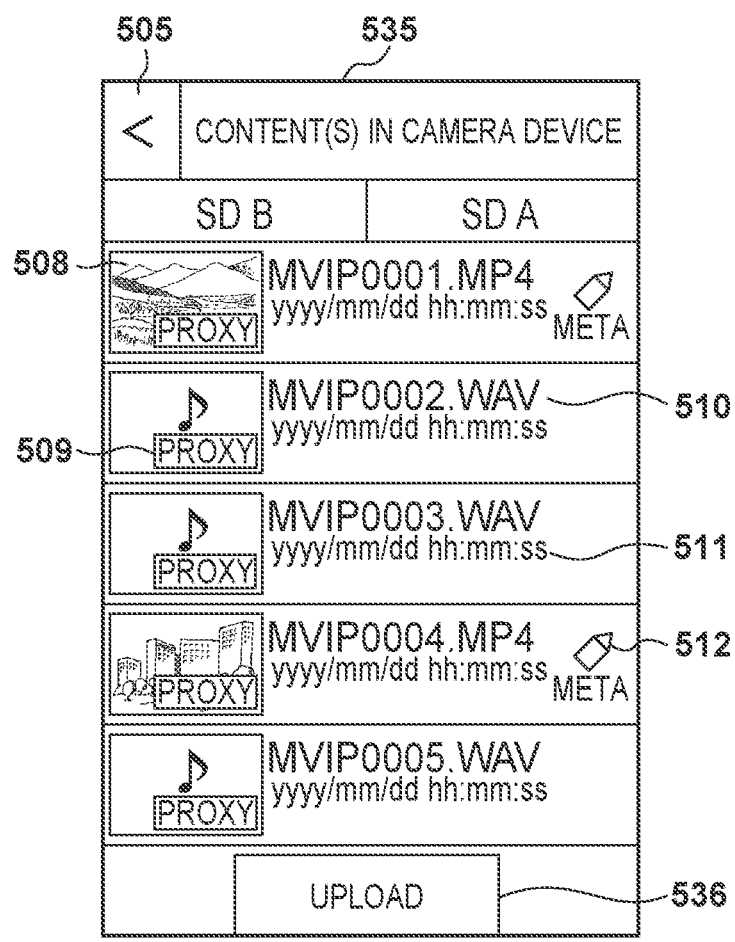
FIG. 6G is a diagram exemplarily showing a UI screen of the file transfer application 301 of the mobile device 200 according to the present embodiment.

The part 524 is a button for completing the file selection; when the button 524 has been tapped, a list screen 535, which will be described later using FIG. 6G, is displayed.

The part 525 is a part for displaying a thumbnail of a file; it displays a thumbnail appended to a moving image file in the case of a moving image file, and displays an image indicating a sound file stored in the nonvolatile memory 203 in the case of a sound file.

The part 526 is a character string indicating a file name, and the part 527 is a character string indicating the recording date and time of a file.

The parts 528 and 529 are icons indicating a selected/unselected state of a file, and are superimposed and displayed on the thumbnail 525. The icon 528 indicates a selected state, whereas the icon 529 indicates an unselected state. Each time the thumbnail 525 of any file is tapped, the selected/unselected state of the file is switched, and the icon that is displayed in accordance with the selected/unselected state of the file is switched to the icon 528 or the icon 529.

A UI screen 530 shown in FIG. 6F is a screen provided by the OS 310, and is a selection screen for selecting files to be read out from among the files managed by the image management application 308. When the button 520 on the function selection screen 501 of FIG. 6D has been tapped, the selection screen 530 is superimposed and displayed on the function selection screen 501 of FIG. 6A. In the present embodiment, it is assumed that the files that can be selected on the selection screen 530 are only moving image files.

A button 531 is a button for cancelling the file selection and returning to a previous screen; tapping the return button 531 results in a return to the function selection screen 501 of FIG. 6D.

A button 532 is a button for completing the file selection; when the button 532 has been tapped, the list screen 535, which will be described later using FIG. 6G, is displayed.

A part 533 is a part for displaying a thumbnail of a file, and displays a thumbnail appended to a moving image file.

A part 534 is an icon indicating a selected state of a file, and is superimposed and displayed on the thumbnail 533. The icon 534 is displayed only when a file is in the selected state. When the thumbnail 533 of a file has been tapped, the selected/unselected state of the file is switched, and display/non-display of the icon 534 is switched in accordance with the selected/unselected state of the file.

The UI screen 535 shown in FIG. 6G is a screen of a list of files that have been selected on the selection screen 522 of FIG. 6E or the selection screen 530 of FIG. 6F, and is displayed when the button 524 on the selection screen 522 of FIG. 6E or the button 532 on the selection screen 530 of FIG. 6F has been tapped.

Parts 508 to 512 on the list screen 535 of FIG. 6G are similar to parts 508 to 512 on the list screen 504 of FIG. 6B, and are generated from information of a list of files that have been selected on the selection screen 522 of FIG. 6E or the selection screen 530 of FIG. 6F and read out from the recording medium 210, and from information related thereto. A method of obtaining information related to files for displaying the parts 508 to 512 will be described later using FIG. 10 to FIG. 12.

A button 505 is a button for returning to a previous screen; tapping the button 505 results in a return to the function selection screen 501 of FIG. 6A.

A button 536 is a button for starting processing for transmitting files from the mobile device 200 to the server 300. The files to be transmitted are all of the files displayed on the list screen 535.

Note that it is permissible to provide a function in which the files that have been selected on the list screen 504 of FIG. 6B from among the files stored in the camera device 100 are collectively transmitted to the server 300, without being stored into the mobile device 200.

<Functions of File Transfer Application 301>

Next, the functions of the file transfer application 301 according to the present embodiment will be described.

The file transfer application 301 according to the present embodiment has the following two functions.

The first function is to communicate with the camera device 100 and store, into the mobile device 200, the files that have been selected by the user from among moving image files and sound files stored in the camera device 100.

The second function is to communicate with the server 300 and transmit (upload), to the server 300, the files that have been selected by the user from among moving image files and sound files stored in the mobile device 200.

The foregoing first function and second function allow the file transfer application 301 to transfer moving image files and sound files stored in the camera device 100 to the server 300 via the mobile device 200.

<Processing Sequence of Camera Device 100 and Mobile Device 200>

Figure 8:
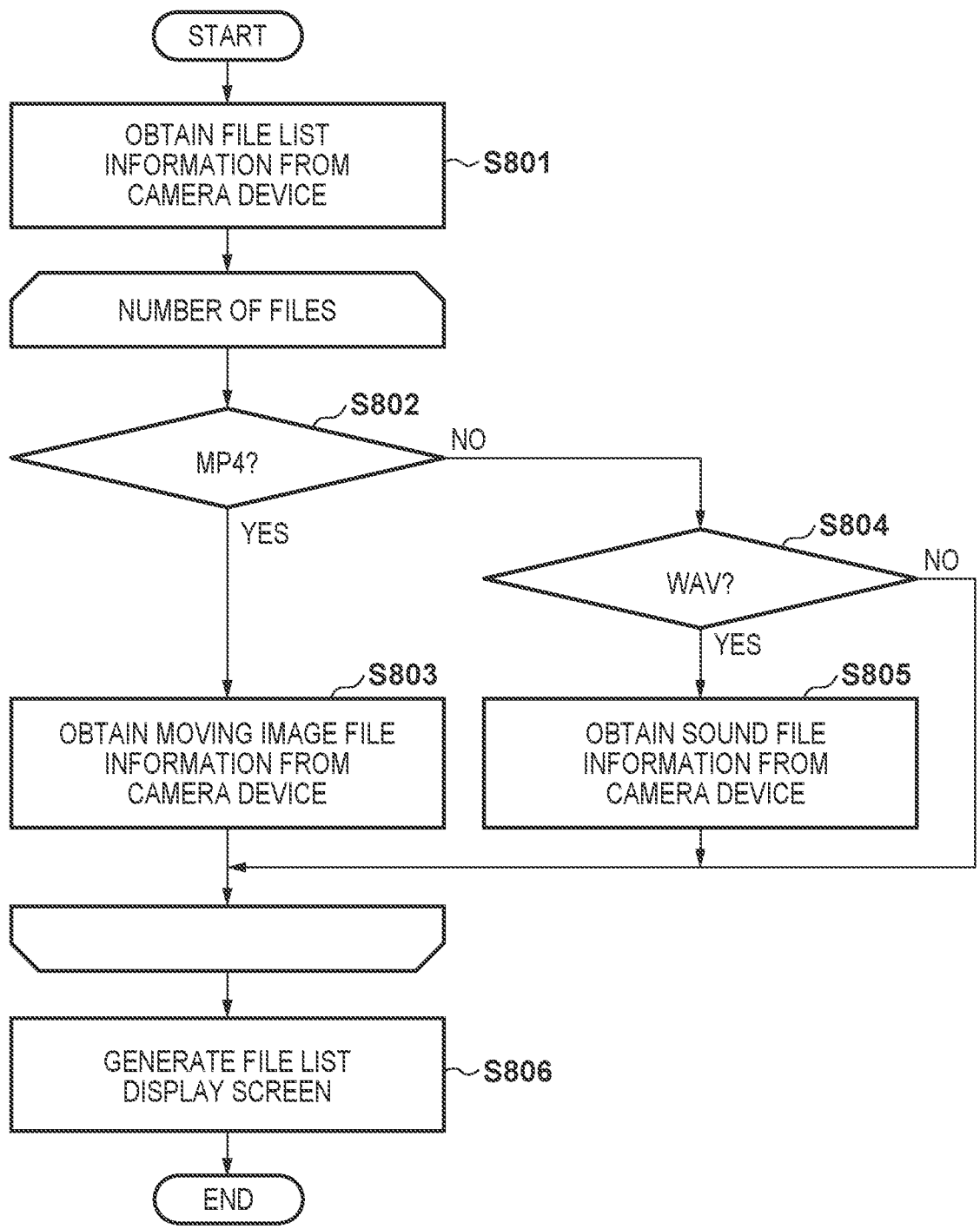
FIG. 8 is a flowchart showing processing of the mobile device 200 according to the present embodiment.
Figure 9:
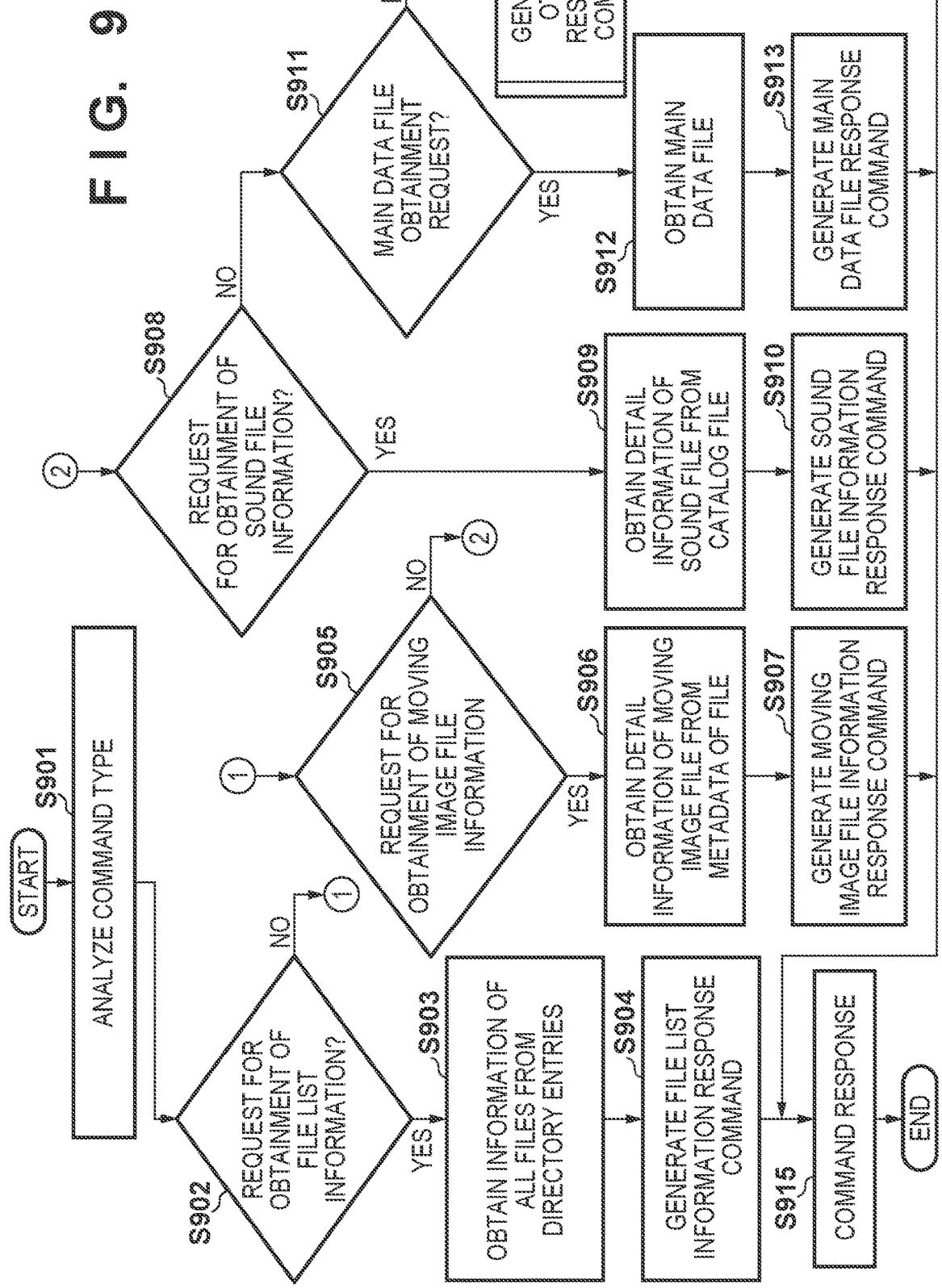
FIG. 9 is a flowchart showing processing of the camera device 100 according to the present embodiment.

Next, with reference to FIG. 7 to FIG. 9, a description is given of processing in which the file transfer application 301 of the mobile device 200 displays the file list screen 504, which is exemplarily shown in FIG. 6B.

FIG. 7 shows a processing sequence of the camera device 100 mobile device 200 from when tapping of the button 502 is detected on the function selection screen 501 of FIG. 6A to when the list screen 504 is displayed.

In T701, upon detection of tapping of the button 502 on the function selection screen 501 of FIG. 6A, the mobile device 200 transmits a request to obtain file list information to the camera device 100.

In T702, upon receiving the obtainment request for file list information from the mobile device 200, the camera device 100 generates file list information using information of files stored in the recording medium 110. Here, it is assumed that the file list information includes the names, format information pieces, and file IDs of the files. A file ID is identification information that is generated uniquely on a file-by-file basis, and is used when issuing, for example, a request to obtain file information pieces, main data files, and the like to the camera device 100.

In T703, once the camera device 100 has generated the file list information, it transmits the file list information to the mobile device 200 as a response to the request of T701. Upon receiving the file list information from the camera device 100, the mobile device 200 refers to the formats of all of the files included in the file list, and executes processing in accordance with the formats.

In a case where a file format is the MP4 format, the mobile device 200 transmits a request to obtain moving image file information to the camera device 100 in T704. In this case, a file for which the moving image file information is to be obtained is designated by assigning a file ID.

In T705, upon receiving the obtainment request for moving image file information from the mobile device 200, the camera device 100 generates moving image file information based on information stored in a metadata storage area of the file. A metadata storage area of a file of the MP4 format includes a recording date and time as detail information of the file; in the present embodiment, it is assumed that the camera device 100 stores a thumbnail into the metadata storage area when generating a moving image file. It is assumed that, as a result of the foregoing, the moving image file information that is generated in T705 with reference to the metadata storage area of the file includes at least the thumbnail and the recording date and time. It is also assumed that the moving image file information further includes information indicating whether a related metadata file exists.

In T706, once the camera device 100 has generated the moving image file information of the file that has been designated by the obtainment request for moving image file information from the mobile device 200, it transmits the moving image file information to the mobile device 200 as a response to the request of T704.

In a case where a file format is WAV, the mobile device 200 transmits a request to obtain sound file information to the camera device 100 in T707. In this case, a file for which the sound file information is to be obtained is designated by assigning a file ID.

In T708, upon receiving the obtainment request for sound file information from the mobile device 200, the camera device 100 generates sound file information based on file information in the catalog file stored in the recording medium 110. It is assumed that file information in the catalog file includes a recording date and time, and sound file information includes at least a recording date and time.

In T709, once the camera device 100 has generated the sound file information of the file designated by the mobile device 200, it transmits the sound file information to the mobile device 200 as a response to the obtainment request for sound file information of T707.

In a case where a file format is neither MP4 nor WAV, it is determined that the file is not to be displayed on the list screen 504 of FIG. 6B, and the mobile device 200 does not execute processing.

Once the mobile device 200 has executed processing with respect to every file in accordance with the format, it generates, in T710, the list screen 504 of FIG. 6B based on the file list information, the moving image file information, and the sound file information obtained from the camera device 100. Note, it is assumed that the order of arrangement of files on the list screen 504 of FIG. 6B is the descending order of recording date and time by default.

<Processing of Mobile Device 200>

Next, with reference to FIG. 8, a description is given of processing of the mobile device 200 for generating the list screen 504 for files stored in the camera device 100.

Note that the file transfer application 301 will be described below as the entity that executes the processing; however, in practice, the processing is realized by the control unit 201 of the mobile device 200 deploying a program of the file transfer application 301 (or functions of the application, the OS, a service of the OS, etc.) stored in the nonvolatile memory 203 to the working memory 204, and executing the program. The same goes for FIG. 10 and FIG. 12, which will be described later. Also, the processing of FIG. 8 is started as triggered when tapping of the button 502 by the operation unit 205 while the file transfer application 301 is displaying the function selection screen 501 of FIG. 6A has been detected.

In S801, the file transfer application 301 obtains the file list information from the camera device 100 through the communication service control 303 so as to display the list screen 504 for files stored in the camera device 100.

Once the file transfer application 301 has obtained the file list information from the camera device 100, it executes processing of steps S802 to S805 with respect to every file included in the file list information.

In S802, the file transfer application 301 determines whether a file format is the MP4 format. In a case where the file transfer application 301 has determined that the file format is the MP4 format, it causes the processing to proceed to S803; in a case where it has determined that the file format is not the MP4 format, it causes the processing to proceed to S804.

In S803, the file transfer application 301 obtains moving image file information from the camera device 100.

In S804, the file transfer application 301 refers to the file list information and determines whether a file format is the WAV format. In a case where the file transfer application 301 has determined that the file format is the WAV format, it causes the processing to proceed to S805; in a case where it has determined that the file format is not the WAV format, it ends the processing, and executes the processing of S802 onward with respect to the next file.

By executing processing of S802 to S804 with respect to every file, the file transfer application 301 obtains information necessary for generation of the file list screen 504 from the camera device 100.

In S806, the file transfer application 301 generates the parts 508 to 512 on the list screen 504 of FIG. 6B from the file list information, moving image file information, and sound file information obtained from the camera device 100.

Through the foregoing processing, the file transfer application 301 generates the screen of the list of files stored in the camera device 100.

<Processing of Camera Device 100>

Next, with reference to FIG. 9, a description is given of processing of the camera device 100 for a case where a communication command has been received from the mobile device 200.

The processing of FIG. 9 is realized by the control unit 101 deploying the program stored in the nonvolatile memory 103 to the working memory 104 and executing the program. Also, the processing of FIG. 9 is started as triggered when the communication unit 111 has received a PTP/IP communication command from the mobile device 200.

In S901, the control unit 101 analyzes the type of the PTP/IP communication command received by the communication unit 111.

In S902, the control unit 101 determines whether the command type is a request to obtain file list information. In a case where the control unit 101 has determined that the command type is the obtainment request for file list information, it causes the processing to proceed to S903; in a case where it has determined that the command type is not the obtainment request for file list information, it causes the processing to proceed to S905.

In S903, the control unit 101 analyzes directory entries in the recording medium 110, and obtains information of all of the files stored in the recording medium 110.

In S904, the control unit 101 generates file IDs for the respective files from the information of the files obtained in S903, and generates file list information including the names, formats, and file IDs of the files as a response command.

In S905, the control unit 101 determines whether the command type is a request to obtain moving image file information. In a case where the control unit 101 has determined that the command type is the obtainment request for moving image file information, it causes the processing to proceed to S906; in a case where it has determined that the command type is not the obtainment request for moving image file information, it causes the processing to proceed to S908.

In S906, the control unit 101 refers to a metadata storage area in a moving image file designated by a file ID, and obtains detail information of the file, including a thumbnail and a recording date and time.

In S907, the control unit 101 generates, as a response command, moving image file information including the thumbnail and the recording date and time from the detail information of the moving image file obtained in S906.

In S908, the control unit 101 determines whether the command type is a request to obtain sound file information. In a case where the control unit 101 has determined that the command type is the obtainment request for sound file information, it causes the processing to proceed to S909; in a case where it has determined that the command type is not the obtainment request for sound file information, it causes the processing to proceed to S911.

In S909, the control unit 101 refers to information in the catalog file stored in the recording medium 110, and obtains detail information of a sound file designated by a file ID, including a recording date and time.

In S910, the control unit 101 generates, as a response command, sound file information including the recording date and time from the detail information of the sound file obtained in S909.

In S911, the control unit 101 determines whether the command type is a request to obtain a main data file. In a case where the control unit 101 has determined that the command type is the obtainment request for a main data file, it causes the processing to proceed to S912; in a case where it has determined that the command type is not the obtainment request for a main data file, it causes the processing to proceed to S914.

In S912, the control unit 101 obtains a main data file designated by a file ID.

In S913, the control unit 101 generates the main data file obtained in S912 as a response command.

In S914, the control unit 101 executes processing in accordance with a command type other than the above-described command types, and generates a response command. As processing of S914 is of low relevance to the present embodiment, a detailed description thereof is omitted.

In S915, the control unit 101, by the communication unit 111 transmits the response command generated in one of S904, S907, S910, and S913 to the mobile device 200, which is a transmission source of the communication command.

Through the above-described processing, the camera device 100 exchanges file information and main data files with an external apparatus such as the mobile device 200 via the communication unit 111.

<File Storage Processing of Mobile Device 200>

Figure 10:
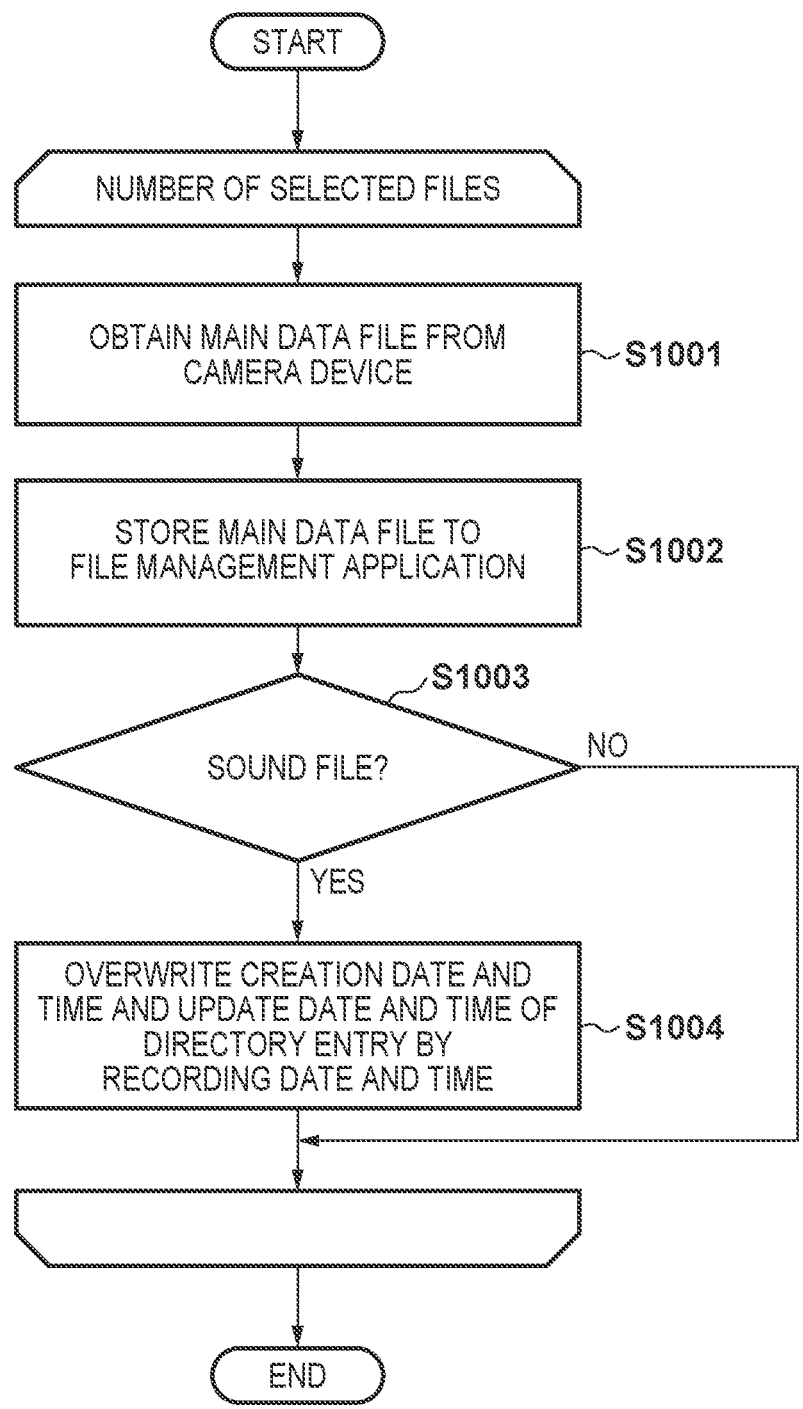
FIG. 10 is a flowchart showing processing of the mobile device 200 according to the present embodiment.

Next, with reference to FIG. 10 and FIGS. 11A and 11B, a description is given of processing for storing the files stored in the camera device 100 into the recording medium 210 of the mobile device 200.

On the list screen 504 of FIG. 6B, the user selects the files to be transferred and stored to the mobile device 200 from among the files stored in the camera device 100. After a file selection operation has been completed, the user taps the button 515, and taps the button 516 or the button 517 of FIG. 6C to select the file management application 306 or the image management application 308 as a file storage destination. Once the application that acts as the storage destination has been selected, the mobile device 200 obtains the selected main data files from the camera device 100, and writes them into a management area of the storage destination application in the recording medium 210.

FIG. 10 is a flowchart showing file storage processing of the mobile device 200 for a case where the file management application 306 has been selected as the storage destination application.

In the processing of FIG. 10, when the file transfer application 301 has detected tapping of the button 516 on the list screen 504 of FIG. 6C via the operation unit 205, it executes processing of S1001 to S1004 of FIG. 10 with respect to all of the files that have been selected.

In S1001, through the communication service control 303, the file transfer application 301 transmits a request to obtain a main data file to the camera device 100 and obtains a main data file that has been selected. Processing executed by the camera device 100 in accordance with the obtainment request for a main data file is as described using FIG. 9.

In S1002, through the file management service control 304, the file transfer application 301 writes the main data file obtained from the camera device 100 into a management area of the file management application 306 in the recording medium 210.

In S1003, the file transfer application 301 determines whether a file format is a sound file format. In a case where the file transfer application 301 has determined that the file format is the sound file format, it causes the processing to proceed to S1004. Also, in a case where the transfer application 301 has determined that the file format is not the sound file format, it ends the processing, and executes the processing of S1001 onward with respect to the next file.

In S1004, through the file management service control 304, the file transfer application 301 overwrites the creation date and time and the update date and time of a directory entry in the management area of the file management application 306 using the recording date and time of a sound file obtained from the camera device 100.

FIGS. 11A and 11B exemplarily show a data structure of directory entries in the management area of the file management application 306 in S1004 of FIG. 10.

A directory entry describes information of a file managed by the file management application 306, and includes a file name 1101, an extension 1102, a creation date and time 1103, an update date and time 1104, and a file size 1105.

FIG. 11A exemplarily shows directory entries for a case where the determination in S1003 of FIG. 10 has resulted in NO and the overwrite processing is not executed in S1004, that is to say, in a case where the files obtained from the camera device 100 have been stored to the file management application 306.

When a file obtained from outside has been stored to the file management application 306, the date and time when the file was stored are written under the creation date and time and the update date and time of a directory entry. Note that although the present embodiment describes an example in which the date and time when the file was stored are written under the creation date and time and the update date and time of the directory entry, there are cases where only the creation date and time or the update date and time, or both of them, are updated depending on the specifications of the OS and the writing method.

FIG. 11B exemplarily shows directory entries for a case where the determination in S1003 of FIG. 10 has resulted in YES and the overwrite processing is executed in S1004. In FIG. 11B, in a case where a file that has been obtained from outside and stored is a sound file, the creation date and time and the update date and time of a directory entry are overwritten using the recording date and time when the sound file was obtained from outside.

As described above, even if a file obtained from outside is a sound file for which the creation date and time and the update date and time are not recorded in a directory entry of the file, the recording date and time of the sound file are recorded in the directory entry of the file by rewriting the creation date and time and the update date and time of the directory entry managed by a storage destination application into the recording date and time of the file obtained from a transmission source. In this way, the mobile device 200 can accurately display a list of files obtained from outside in accordance with recording dates and times.

Note that although the present embodiment has described an example in which both of the creation date and time and the update date and time of a file are rewritten into the recording date and time, one of the creation date and time and the update date and time of the file may be rewritten.

<Processing for Displaying List of Files Stored in Mobile Device 200>

Figure 12:
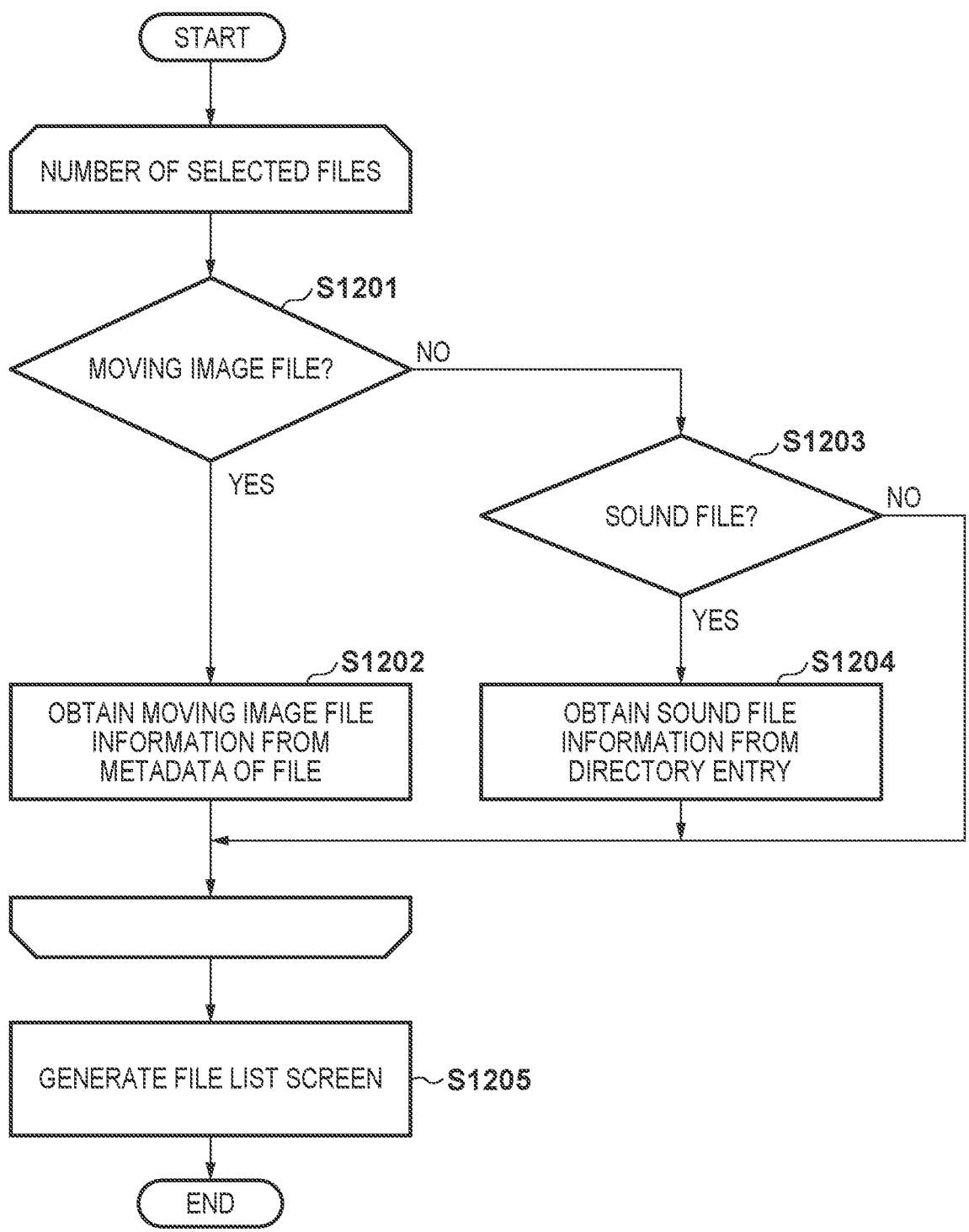
FIG. 12 is a flowchart showing processing of the mobile device 200 according to the present embodiment.

Next, with reference to FIG. 12, a description is given of processing for retrieving files from the file management application 306 and generating the file list screen 535 of FIG. 6G.

The processing of FIG. 12 is started as triggered when the file management application 306 has detected tapping of the button 524 in a state where one or more files have been selected on the file selection screen 522 of FIG. 6E, that is to say, upon completion of selection of the files.

The file transfer application 301 executes processing shown in S1201 to S1203 with respect to all of the selected files.

In S1201, the file transfer application 301 determines whether a file is in the MP4 format. In a case where the file transfer application 301 has determined that the file is in the MP4 format, it causes the processing to proceed to S1202; in a case where it has determined that the file is not in the MP4 format, it causes the processing to proceed to S1203.

In S1202, the file transfer application 301 analyzes a metadata storage area of the file, and obtains moving image file information of the file, including a thumbnail and a recording date and time.

In S1203, the file transfer application 301 determines whether the file is in the WAV format. In a case where the file transfer application 301 has determined that the file is in the WAV format, it causes the processing to proceed to S1204; in a case where it has determined that the file is not in the WAV format, it ends the processing, and executes the processing of S1201 onward with respect to the next file.

In S1204, the file transfer application 301 refers to a directory entry in the file management application 306, and obtains sound file information by construing the creation date and time of the file as the recording date and time.

By thus overwriting, or rewriting, the creation date and time of the file in the directory entry using the recording date and time in advance, the accurate recording date and time can be obtained in a case where a sound file is retrieved.

As a result of executing the above-described processing of S1201 to S1204 with respect to every file, the file transfer application 301 obtains information necessary for generation of the file list screen 535 from the file management application 306.

In S1205, the file transfer application 301 generates the file list screen 535 of FIG. 6G from moving image file information and sound file information obtained from the file management application 306.

Note, it is assumed that the order of arrangement of files on the list screen 535 of FIG. 6G is the descending order of recording date and time by default.

Through the above-described processing, in a case where a screen of a list of files stored in the file management application 306 is displayed, the file transfer application 301 can display accurate recording dates and times, even for sound files that cannot store the recording dates and times therein.

Modification Examples

Although the above embodiment has described an example in which sound files in the WAV file format are handled, sound files may be files of other formats that do not allow the recording dates and times to be stored.

Furthermore, although the above embodiment has described an example in which sound files are used as a file type that does not allow the recording dates and times to be stored, files that cannot store the recording dates and times may be used in place of sound files. For example, processing similar to that for sound files may be executed also in a case where metadata files of the XML format and the like, which are generated when capturing moving images, are handled.

Also, although the above-described embodiment determines whether the recording dates and times exist in connection with files based on a file format, whether the recording date and time exists on a per-file basis may be managed by management means such as a catalog file in preparation for, for example, a case where files of the original format and the like are handled. In this case, it is possible to provide a management unit that manages whether the creation date and time and the update date and time of a file have been updated when storing the file into the mobile device 200, and for referring to the same when reading out file information from the mobile device 200.

According to the present invention, even in a case where a file obtained from outside does not include supplementary information such as a creation date and time, display can be performed accurately in accordance with the recording date and time of the file.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that communicates with a first external apparatus, comprising:
   at least one processor; and
   a memory coupled to the at least one processor, the memory having instructions that, when executed by the processor, perform operations as:
   a storage unit that stores a file obtained from the first external apparatus, and stores first information related to at least one of a creation date and time and an update date and time of the file; and
   a determination unit that, based on a format of the file obtained from the first external apparatus, determines that the file obtained from the first external apparatus is a first file to which second information related to a recording date and time when the file has been recorded is attached or a second file to which the second information is not attached; and
   a control unit that
   in a case where the file obtained from the first external apparatus is the first file, stores the first file into the storage unit, and stores the first information of the first file into the storage unit, and
   in a case where the file obtained from the first external apparatus is the second file, obtains, from the first external apparatus, second information related to a recording date and time when the second file has been recorded, and rewrites the first information into the second information when storing the second file into the storage unit.

2. The communication apparatus according to claim 1, wherein
   in a case where the second file stored in the storage unit is transmitted to a second external apparatus, the control unit reads out the second file from the storage unit, and obtains the second information with reference to the first information of the second file stored in the storage unit.

3. The communication apparatus according to claim 2, further comprising
   a display unit that displays a list of files stored in the storage unit,
   wherein in a case where a file stored in the storage unit is the second file, the control unit obtains the second information with reference to the first information of the second file stored in the storage unit, and displays the second information on the list of files.

4. The communication apparatus according to claim 1, wherein the determination unit determines whether the file obtained from the first external apparatus is the first file or the second file.

5. The communication apparatus according to claim 4, wherein
the determination unit determines whether the file obtained from the first external apparatus is the first file or the second file based on a format of the file obtained from the first external apparatus.

6. The communication apparatus according to claim 4, wherein
the determination unit determines that the obtained file is the second file in a case where a format of the obtained file is a sound file format.

7. The communication apparatus according to claim 5, wherein
the determination unit determines that the obtained file is the first file in a case where the format of the first file is a still image or moving image file format.

8. The communication apparatus according to claim 1, wherein
in a case where the control unit has rewritten the first information into the second information when storing the second file into the storage unit, the control unit stores the second file and information indicating whether the first information has been rewritten, in association with each other.

9. An image capture apparatus that communicates with an external apparatus, comprising:
at least one processor; and
a memory coupled to the at least one processor, the memory having instructions that, when executed by the processor, perform operations as:
a generation unit that generates a file including image data or sound data;
a management unit that
in a case where the file including the sound data is generated, generates a management file which associates a file name of the file with a recording date and time of the file, and stores the management file in a storage unit, and
in a case where the file including the image data is generated, generates a metadata file that includes a recording date and time of the image data, and stores the metadata file in the storage unit; and
a control unit that,
in a case where the control unit receives an obtainment request of the file including the sound data from the external apparatus, transmits sound file information including the recording date and time to the external apparatus based on information in the management file for the sound data, and
in a case where the control unit receives an obtainment request of the file including the image data from the external apparatus, transmits image file information including at least the recording date and time to the external apparatus based on information in the metadata file for the image data.

10. The image capture apparatus according to claim 9, wherein
when storing the file generated by the generation unit into the storage unit, the management unit generates and stores the file in which the recording date and time and a file name of the file have been associated with each other.

11. The image capture apparatus according to claim 9, wherein
in a case where the obtainment request has been received from the external apparatus, the control unit transmits, to the external apparatus, information of a list of files stored in the storage unit.

12. The image capture apparatus according to claim 9, wherein the image file information includes a thumbnail of the image file.

13. A control method for a communication apparatus that communicates with an external apparatus, comprising:
storing a file obtained from a first external apparatus, and storing first information related to at least one of a creation date and time and an update date and time of the file into a storage unit; and
determining, based on a format of the file obtained from the first external apparatus, that the file obtained from the first external apparatus is a first file to which second information related to a recording date and time when the file has been recorded is attached or a second file to which the second information is not attached; and
in a case where the file obtained from the first external apparatus is the first file, storing the first file into the storage unit, and storing the first information of the first file into the storage unit, and
in a case where the file obtained from the first external apparatus is the second file, obtaining, from the first external apparatus, second information related to a recording date and time when the second file has been recorded, and rewriting the first information into the second information when storing the second file into the storage unit.

14. A control method for an image capture apparatus that communicates with an external apparatus, comprising:
generating a file including image data or sound data;
in a case where the file including the sound data is generated, generating a management file which associates a file name of the file with a recording date and time of the file, and storing the management file in a storage unit,
in a case where the file including the image data is generated, generating a metadata file that includes a recording date and time of the image data, and storing the metadata file in the storage unit,
in a case where an obtainment request of the file including the sound data is received from the external apparatus, transmitting sound file information including the recording date and time to the external apparatus based on information in the management file for the sound data, and
in a case where an obtainment request of th file including the image data is received from the external apparatus, transmitting image file information including at least the recording date and time to the external apparatus based on information in the metadata file for the image data.

15. A non-transitory computer-readable storage medium storing a program for causing a computer to execute a control method for a communication apparatus that communicates with an external apparatus, comprising:
storing a file obtained from a first external apparatus, and storing first information related to at least one of a creation date and time and an update date and time of the file into a storage unit; and determining, based on a format of the file obtained from the first external apparatus, that the file obtained from the first external apparatus is a first file to which second information related to a recording date and time when the file has been recorded is attached or a second file to which the second information is not attached;

in a case where the file obtained from the first external apparatus is the first file, storing the first file into the storage unit, and storing the first information of the first file into the storage unit, and in a case where the file obtained from the first external apparatus is the second file, obtaining, from the first external apparatus, second information related to a recording date and time when the second file has been recorded, and rewriting the first information into the second information when storing the second file into the storage unit.

16. A non-transitory computer-readable storage medium storing a program for causing a computer to execute a control method for an image capture apparatus that communicates with an external apparatus, comprising:

generating a file including image data or sound data;

in a case where the file including the sound data is generated, generating a management file which associates a file name of the file with a recording date and time of the file, and storing the management file in a storage unit, in a case where the file including the image data is generated, generating a metadata file that includes a recording date and time of the image data, and storing the metadata file in the storage unit, in a case where an obtainment request of the file including the sound data is received from the external apparatus, transmitting sound file information including the recording date and time to the external apparatus based on information in the management file for the sound data, and in a case where an obtainment request of the file including the image data is received from the external apparatus, transmitting image file information including at least the recording date and time to the external apparatus based on information in the metadata file for the image data.

* * * * *